United States Patent
Singh et al.

(10) Patent No.: US 10,311,987 B2
(45) Date of Patent: Jun. 4, 2019

(54) WET STORAGE FACILITY FOR NUCLEAR FUEL

(71) Applicant: Holtec International, Marlton, NJ (US)

(72) Inventors: Krishna P. Singh, Hobe Sound, FL (US); Joseph Rajkumar, Marlton, NJ (US)

(73) Assignee: Holtec International

(*) Notice: Subject to any disclaimer, the term of this patent is extended or adjusted under 35 U.S.C. 154(b) by 920 days.

(21) Appl. No.: 14/817,885

(22) Filed: Aug. 4, 2015

(65) Prior Publication Data
US 2016/0035444 A1 Feb. 4, 2016

Related U.S. Application Data

(60) Provisional application No. 62/032,946, filed on Aug. 4, 2014.

(51) Int. Cl.
*G21C 19/07* (2006.01)
*G21C 19/32* (2006.01)
(Continued)

(52) U.S. Cl.
CPC .............. *G21C 19/07* (2013.01); *G21C 19/08* (2013.01); *G21C 19/32* (2013.01); *G21F 7/00* (2013.01); *G21F 7/005* (2013.01)

(58) Field of Classification Search
CPC ........ G21C 19/07; G21C 19/08; G21C 19/32; G21F 7/00; G21F 7/005
(Continued)

(56) References Cited

U.S. PATENT DOCUMENTS 3,945,509 A * 3/1976 Weems ............... G21F 5/14
                                                    376/272
4,050,983 A * 9/1977 Kleimola ............ G21C 9/00
                                                    376/293
(Continued)

FOREIGN PATENT DOCUMENTS

CN   203070791   7/2013
CN   103928069   7/2014
(Continued)

OTHER PUBLICATIONS

Hofmann, "The Technology of High-Level Nuclear Waste Disposal", DOE/TIC-4621 (DE82009594), 1981. (Year: 1981).*
(Continued)

*Primary Examiner* — Jack W Keith
*Assistant Examiner* — Daniel Wasil
(74) *Attorney, Agent, or Firm* — The Belles Group, P.C.

(57) ABSTRACT

An autonomous facility for storing spent nuclear fuel includes a building forming an enclosed interior space containing a water-filled spent fuel pool. The pool includes fuel racks containing spent fuel assemblies which heat the water via radioactive decay. A passive cooling system includes a submerged heat exchanger in the pool and an air cooled heat exchanger located in ambient air outside the building at a higher elevation than the pool heat exchanger. A heat transfer working fluid circulates in a closed flow loop between the heat exchangers via unpumped natural gravity driven flow to cool the fuel pool. The air cooled heat exchanger may be enclosed in a concrete reinforced silo adjoining the building for impact protection. The building may include a cask pit formed integrally with the pool to allow fuel assembles to be removed from a transport cask and loaded into the fuel rack underwater.

18 Claims, 19 Drawing Sheets

(51) Int. Cl.
*G21C 19/08* (2006.01)
*G21F 7/00* (2006.01)
*G21F 7/005* (2006.01)

(58) Field of Classification Search
USPC .......................................................... 376/272
See application file for complete search history.

(56) References Cited

U.S. PATENT DOCUMENTS

| | | | |
|---|---|---|---|
| 4,053,067 A | | 10/1977 | Katz et al. |
| 4,060,575 A | * | 11/1977 | Uhlirsch .................. E04H 5/12 |
| | | | 376/402 |
| 4,069,923 A | * | 1/1978 | Blumenau .............. G21C 19/32 |
| | | | 376/272 |
| 4,129,627 A | * | 12/1978 | Furr .......................... F28C 1/00 |
| | | | 376/287 |
| 4,450,134 A | * | 5/1984 | Soot ....................... G21C 19/32 |
| | | | 376/272 |
| 4,702,879 A | | 10/1987 | Tower et al. |
| 4,950,448 A | | 8/1990 | Gou et al. |
| 5,075,070 A | | 12/1991 | Costes |
| 5,268,942 A | * | 12/1993 | Newton ............... G21C 15/182 |
| | | | 376/272 |
| 5,488,642 A | | 1/1996 | Malik et al. |
| 5,498,825 A | | 3/1996 | Stahl |
| 7,068,748 B2 | | 6/2006 | Singh |
| 2012/0051484 A1 | * | 3/2012 | Schmidt .................. G21C 19/07 |
| | | | 376/273 |
| 2012/0106692 A1 | * | 5/2012 | Keenan .................. G21C 11/02 |
| | | | 376/203 |
| 2012/0294407 A1 | * | 11/2012 | Namba .................. G21C 9/004 |
| | | | 376/272 |
| 2012/0294737 A1 | | 11/2012 | Singh et al. |
| 2014/0003567 A1 | | 1/2014 | Sato et al. |

FOREIGN PATENT DOCUMENTS

| | | |
|---|---|---|
| CN | 204029398 | 12/2014 |
| JP | 4014748 | 11/2007 |
| JP | 2012141324 | 7/2012 |
| JP | 2014109547 | 6/2014 |

OTHER PUBLICATIONS

Yanagi, "Numerical simulation of water temperature in a spent fuel pit during the shutdown of its cooling systems", Journal of Power and Energy Systems 6, No. 3 (Apr. 2012) pp. 423-434. (Year: 2012).*

Corresponding International Search Report and Written Opinion for PCT/US15/43625 dated Dec. 14, 2015.

The spent-fuel crisis: Region's nuclear plants pack pools with waste, http://www.stamfordadvocate.com/local/article/The-spent-fuel-crisis-Region-s-nuclear-plants-1309964.php#photo-816161, Apr. 5, 2011.

* cited by examiner

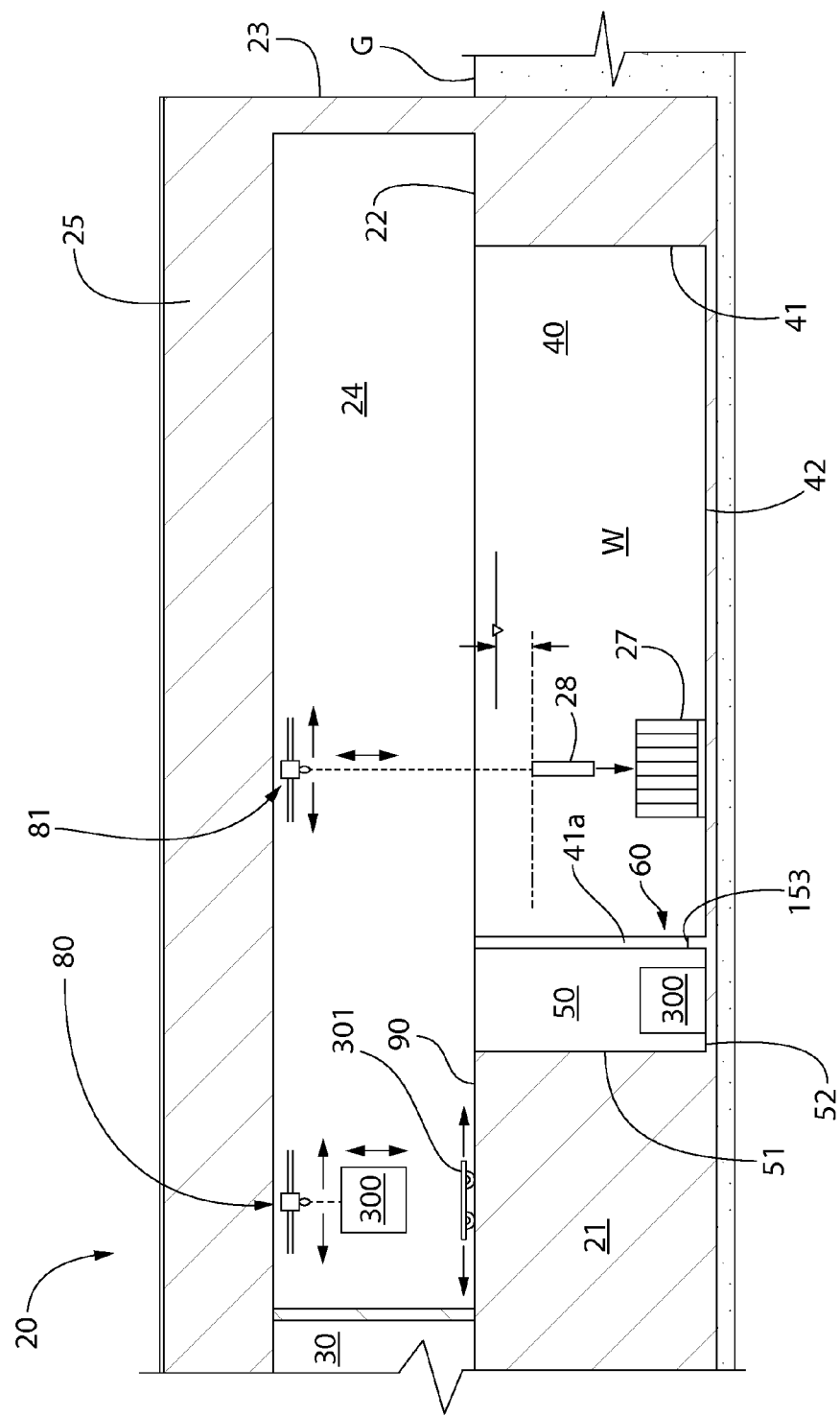

WET STORAGE FACILITY FOR NUCLEAR FUEL

CROSS-REFERENCE TO RELATED APPLICATIONS

The present application claims the benefit of priority to U.S. Provisional Application No. 62/032,946 filed Aug. 4, 2014, the entirety of which is incorporated herein by reference.

BACKGROUND

The present invention generally relates to storage of nuclear fuel assemblies, and more particularly to a facility for wet storage of such fuel assemblies.

The largest quantity of radioactive (irradiated) material in commercial nuclear power plants is in the form of spent fuel stored under water in spent fuel pools. The nuclear accident in Fukushima in which the pools' cooling systems failed leading to severe damage to the plant highlighted the vulnerability of present day wet storage systems. The Fukushima catastrophe is partially attributed to the disabling of the pools' pumped cooling systems by the flooding caused by tsunami and fracture in the pools' reinforced concrete structure by the earthquake. An abject lesson of Fukushima is to make fuel storage systems tsunami and earthquake proof so as to prevent damage to the infrastructure (namely the fuel pool, building, and supporting systems) needed for keeping the spent fuel pool in safe configuration. Terrorist attacks have introduced crashing aircraft and missiles as Design Basis Threats (DBT) to a spent fuel storage facility.

An improved design is desired.

SUMMARY

The present invention pertains to an autonomous wet storage facility for spent nuclear fuel which can withstand a severe hydrological event such as a storm surge or a tsunami without losing its heat rejection capacity. The proposed design also envisages a hardened structure that can withstand a site's Design Basis Earthquake (DBE) and DBT. An autonomous spent fuel pool infrastructure with capability to transfer fuel from other sites/nuclear plants and to cool and protect the spent fuel from cataclysmic natural events and sabotage is provided. The infrastructure further comprises a missile proof and earthquake resistant reinforced concrete building construction.

The above design objectives may be fulfilled in one implementation by an autonomous spent fuel pool storage facility or building that comprises the following: a spent fuel pool; a cask pit integral to and in fluid communication with the pool; an access bay or staging area to support fuel canister moving devices when staging nuclear fuel assembly transport casks; one or more cranes for moving the casks and loading/unloading fuel assemblies; a pool water cleanup system; a passive pool cooling systems optionally supplemented by active cooling systems; and an air lock at the entrance to the access bay to prevent uncontrolled interaction of the building internal environment with the external ambient air; an air filtration, clean up and pressure control system operable to maintain the interior environment of the building at a slight negative pressure to prevent release of air within the building to the external environment; and a missile proof and earthquake resistant steel reinforced concrete building superstructure that encloses and integrates all the above within a single controlled building environment.

In one aspect, a building for wet storage of spent nuclear fuel includes: a longitudinal axis; a concrete base mat defining a substantially horizontal operating deck; a plurality of substantially vertical perimeter walls supported by the base mat; a roof spanning across the perimeter walls; a fuel pool recessed in the base mat below the operating deck and having a first depth, the fuel pool containing coolant water having a surface level; a cask pit recessed in the base mat below the operating deck and formed integrally with the fuel pool, the cask pit located adjacent the fuel pool and having a second depth; a fluid passageway formed through the base mat between the cask pit and fuel pool, the cask pit in fluid communication through the passageway with the fuel pool such that liquid coolant is exchangeable between the fuel pool and cask pit; and an isolation gate movably disposed in the passageway which is operable to fluidly isolate the cask pit from the fuel pool, the gate movable between an open position in which liquid coolant can flow between the fuel pool and cask pit, and a closed position in which liquid coolant cannot flow between the fuel pool and cask pit; wherein when the gate is in the open position, water from the fuel pool flows into the cask pit such that the surface level of water in the cask pit and pool equalize.

In another aspect, an autonomous impact resistant wet storage facility for spent nuclear fuel includes: a longitudinal axis; a concrete base mat defining a substantially horizontal axis, the base mat disposed in soil having a grade and extending for a depth below grade; a plurality of substantially vertical concrete perimeter walls supported by the base mat, the perimeter walls extending upwards from the operating deck and rising above grade; a concrete roof spanning across the perimeter walls and collectively forming an enclosed building with the perimeter walls and base mat; a fuel pool disposed in the building and recessed in the base mat below the operating deck for storing nuclear fuel assemblies, the fuel pool containing water for cooling the fuel assemblies; a cask pit recessed in the base mat below the operating deck and formed integrally with the fuel pool, the cask pit located adjacent the fuel pool and having a second depth; a vertically elongated fluid passageway formed through the base mat between the cask pit and fuel pool, the passageway extending vertically through the operating deck, wherein the cask pit is in fluid communication through the passageway with the fuel pool such that pool water is flowable between the fuel pool and cask pit; an isolation gate movably disposed in the passageway which operates to fluidly isolate the cask pit from the fuel pool, the gate movable between an open position in which the passageway is unobstructed so pool water can flow between the fuel pool and cask pit, and a closed position in which the passageway is obstructed so pool water cannot flow between the fuel pool and cask pit; a passive cooling system for cooling the water in the fuel pool, the cooling system comprising an internal immersion heat exchanger submerged in the fuel pool and an external air cooled heat exchanger located outside the perimeter walls, the immersion heat exchanger located below grade and the air cooled heat exchanger located above grade creating an elevation difference; a closed flow loop formed between the immersion and air cooled heat exchangers, the flow loop containing a circulating heat exchange working fluid; wherein the working fluid circulates by natural gravity driven flow between the immersion and air cooled heat exchangers such that the fuel pool is cooled in the absence of electric power to the facility.

A method for storing spent nuclear fuel is provided. The method includes: providing a building comprising an interior space, a base mat defining an operating deck, perimeter sidewalls extending from the base mat, a roof spanning the sidewalls, a fuel pool in the base mat containing water, and a cask pit in the base mat in fluid communication with the fuel pool through an openable and closeable fluid passageway, the passageway being in a closed position and dewatered condition; moving a spent nuclear fuel transport cask onto the operating deck inside the building, the cask comprising a removable top lid and internal cavity holding a plurality of spent nuclear fuel assemblies; lifting the cask into the cask pit; opening the passageway which fills the cask pit with water from the fuel pool, the cask submerged in the water which has a same surface level in the cask pit and fuel pool; removing the lid from the cask; removing a first fuel assembly through an open top of the cask; moving the first fuel assembly through the passageway in an upright position from the cask pit into the fuel pool underwater; and inserting the first spent fuel assembly into a fuel rack positioned on a bottom of the fuel pool. In other embodiments, the method further includes: closing the passageway when a last fuel assembly is removed from the cask; pumping water from the cask pit back into the fuel pool to dewater the cask pit; lifting the cask out of the cask pit; and placing the cask on the operating deck inside the building. In certain embodiments, the cask is lifted using a first crane and the first fuel assembly is removed from the cask and moved into the fuel pool using a second crane, the first crane having a larger lifting weight capacity than the second crane.

BRIEF DESCRIPTION OF THE DRAWINGS

The features of the exemplary embodiments will be described with reference to the following drawings where like elements are labeled similarly, and in which:

FIG. 10B is a partial longitudinal enlarged cross-sectional view thereof;

All drawings are schematic and not necessarily to scale. Parts shown and/or given a reference numerical designation in one figure may be considered to be the same parts where they appear in other figures without a numerical designation for brevity unless specifically labeled with a different part number and described herein. References herein to a figure number (e.g. FIG. 1) shall be construed to be a reference to all subpart figures in the group (e.g. FIGS. 1A, 1B, etc.) unless otherwise indicated.

DETAILED DESCRIPTION

Figure 1:
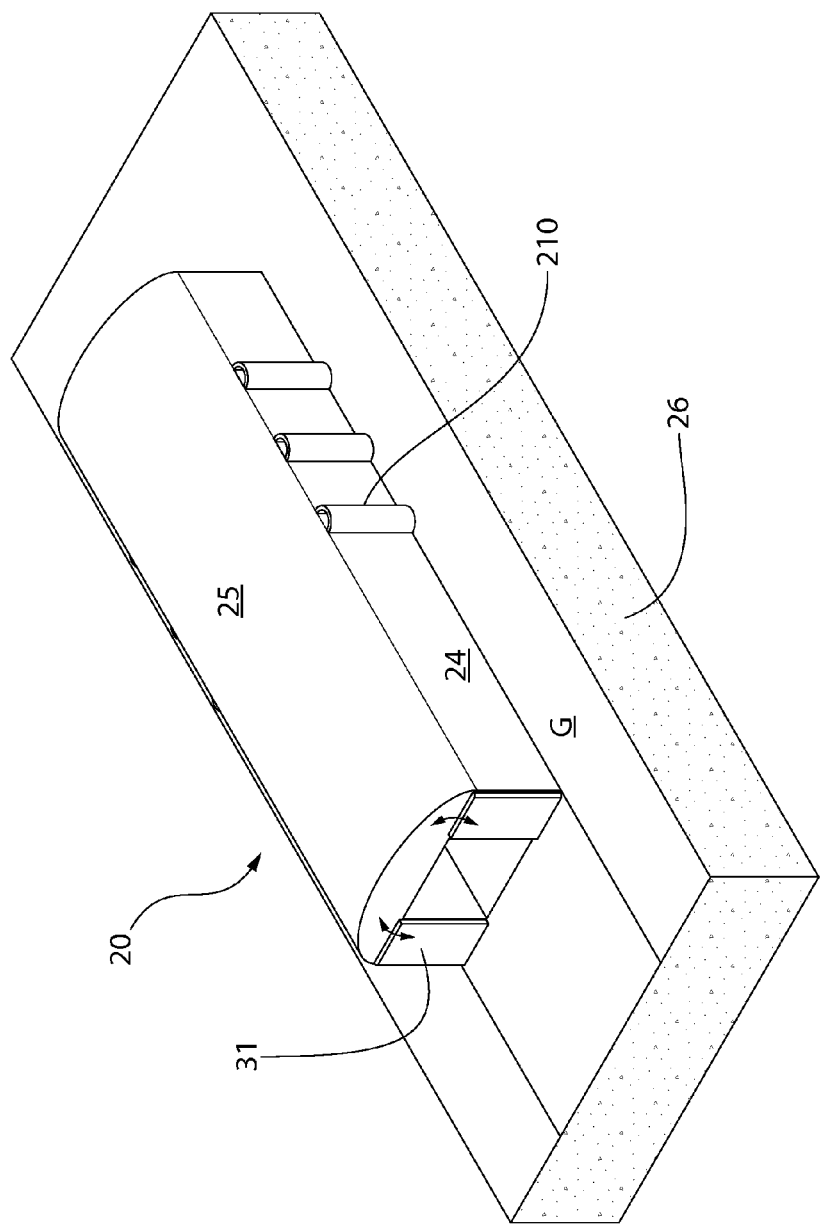
FIG. 1 is perspective view of an autonomous impact-resistant wet spent fuel storage facility comprising a building according to the present disclosure.
Figure 2:
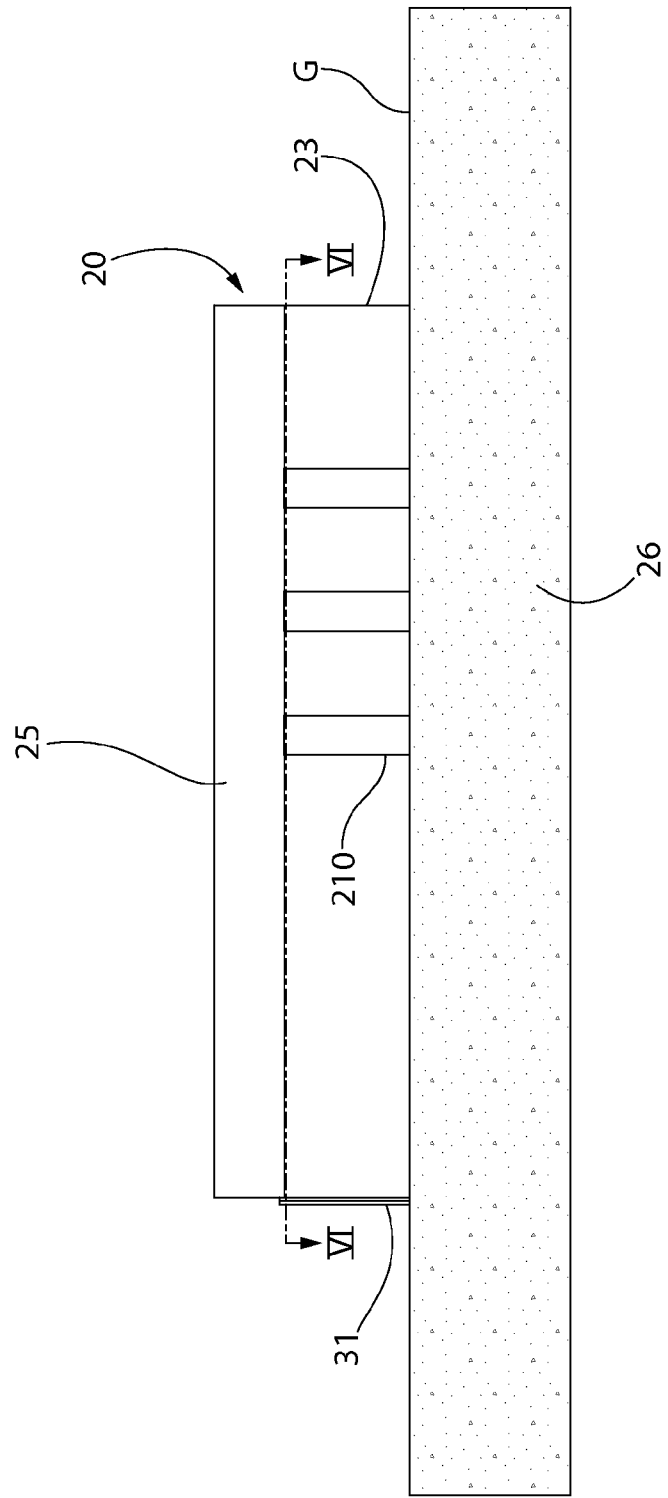
FIG. 2 is a lateral side elevation view thereof.
Figure 3:
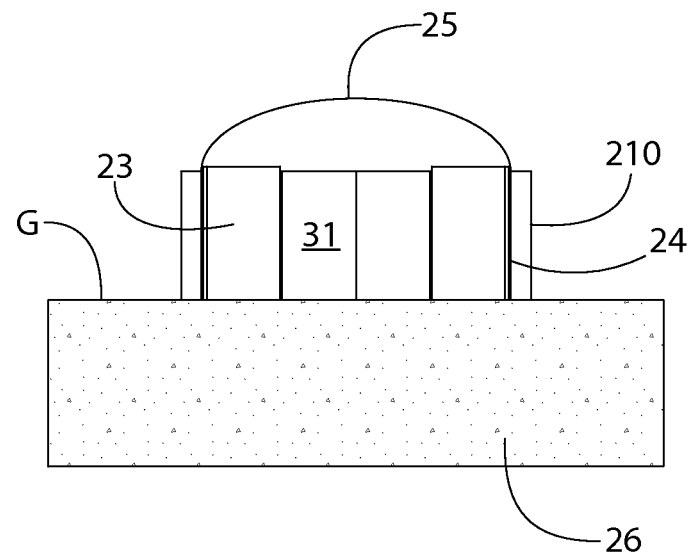
FIGS. 3 and 4 are end elevation views thereof.
Figure 4:
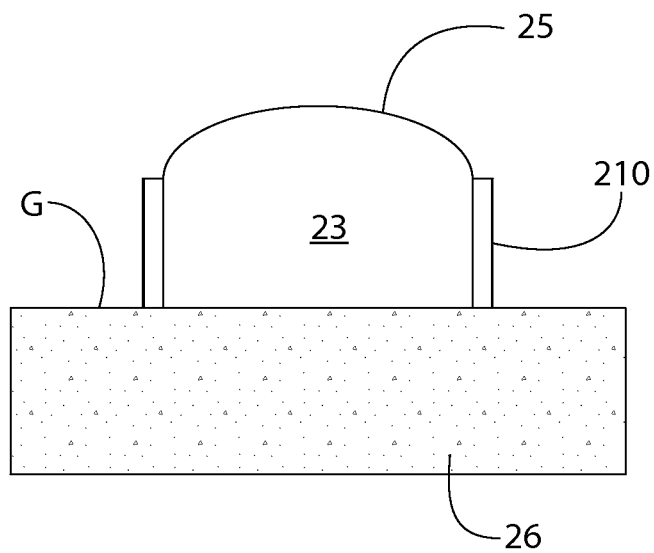
Figure 5:
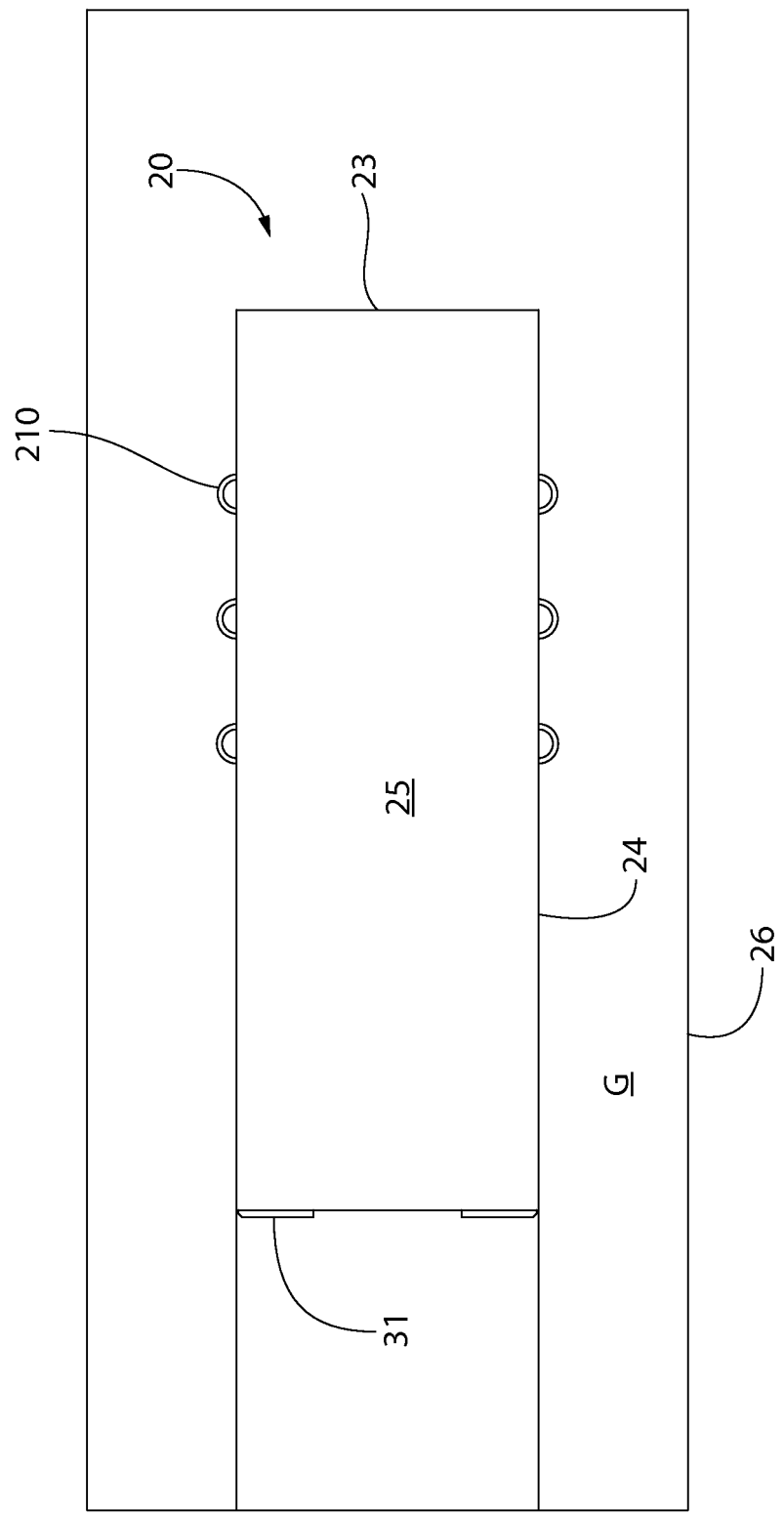
FIG. 5 is a top plan view thereof.

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Referring to FIGS. 1-12 initially, the autonomous nuclear fuel storage facility includes a building 20 which is a reinforced concrete structure that is designed to enclose (and protect) the fuel pool and all its supporting systems. Building 20 includes a longitudinal axis LA, a steel reinforced concrete base mat 21 that defines a substantially horizontal operating deck 22, a plurality of substantially vertical perimeter walls supported by the base mat, and a roof 25 spanning across and supported by the perimeter walls. In one implementation, the perimeter walls may include two opposing end walls 23 and two opposing sidewalls 24. The walls 23, 24 and roof 25 may also be formed of steel reinforced concrete similar to the base mat 21 to provide missile or projectile impact resistant construction. In one embodiment, a domed roof 25 may be provide having a arcuately curved profile between the sidewalls 24 to enhance the strength and impact resistance of the roof, and to shed water.

In one embodiment, the building 20 may have an elongated rectangular shape in top plan view in which the two sidewalls 24 are longer than the two end walls 23 as illustrated. In other possible embodiments, the building shape may be square. The invention is not limited to either building configuration.

The base mat 21 may be the same size or larger in dimension than the length (defined by the sidewalls 24 parallel to the longitudinal axis LA) and/or width (define by the end walls 23 perpendicular to the longitudinal axis) of the walls. This provides a large stable platform for the building 20 for both earthquake and impact resistance. The base mat may rest on a top of or be buried in soil 26 which defines the grade G.

In one non-limiting exemplary embodiment, the surface of the operating deck 22 is at least 5 feet above the maximum 100 year flood level for the site in one embodiment. The spent fuel pool 40 extending below the operating deck level may be approximately 40 feet or more deep (e.g. 42 feet in one embodiment). The fuel pool is long enough to accommodate as many spent fuel assemblies as required. In one embodiment, the fuel pool 40 may be about 60 feet wide. There is sufficient operating deck space around the pool to provide space for the work crew and for staging necessary tools and equipment for the facility's maintenance. There are no penetrations in the spent fuel pool 40 in the bottom 30 feet of depth to prevent accidental draining of water and uncovering of the spent fuel.

The end walls 23 may be at least 6 feet thick with the front end wall 23a providing the entrance to the facility through an air lock 30 as further described herein. The perimeter walls 23, 24 in this embodiment are built on top of the thick concrete base mat 21 that is at least 40 feet thick or more depending on the depth of the spent fuel pool 40. The side walls 24 may be approximately 5 feet thick. The domed roof may have a thickness at its apex of at least 10 feet. The building may be a minimum of 35 feet high or tall (excluding the height of the domed roof) to accommodate one or more cranes, spent fuel canister or casks traversing the operating deck, and the cask transport crawler during the fuel transfer operation between the casks and the fuel pool. The length of the building 20 is sufficient to enclose the pool, the access bay, the air lock, and to provide interior space around for unimpeded personnel access and equipment movement. Suitable interior and/or exterior structural steel members that may be necessary to properly support the walls, roof, cranes, and other equipment or appurtenances associated with the spent fuel facility may be provided but are not shown for clarity.

With continuing reference to FIGS. 1-12, the spent fuel pool 40 is recessed into the concrete base mat 21 and extends from the operating deck 22 downwards to a sufficient depth D1 to allow fuel bundles or assemblies 28 (see FIG. 15) holding a plurality of individual fuel rods to be moved and loaded into fuel assembly racks positioned on the bottom of the pool while remaining completely submerged beneath the surface level of the pool water W for radiation shielding purposes. In one implementation, the fuel pool 40 has a depth such that at least 10 feet of water is present above the top of the fuel assembly when moved within the pool and loaded underwater into the top of the fuel racks.

Figure 12:
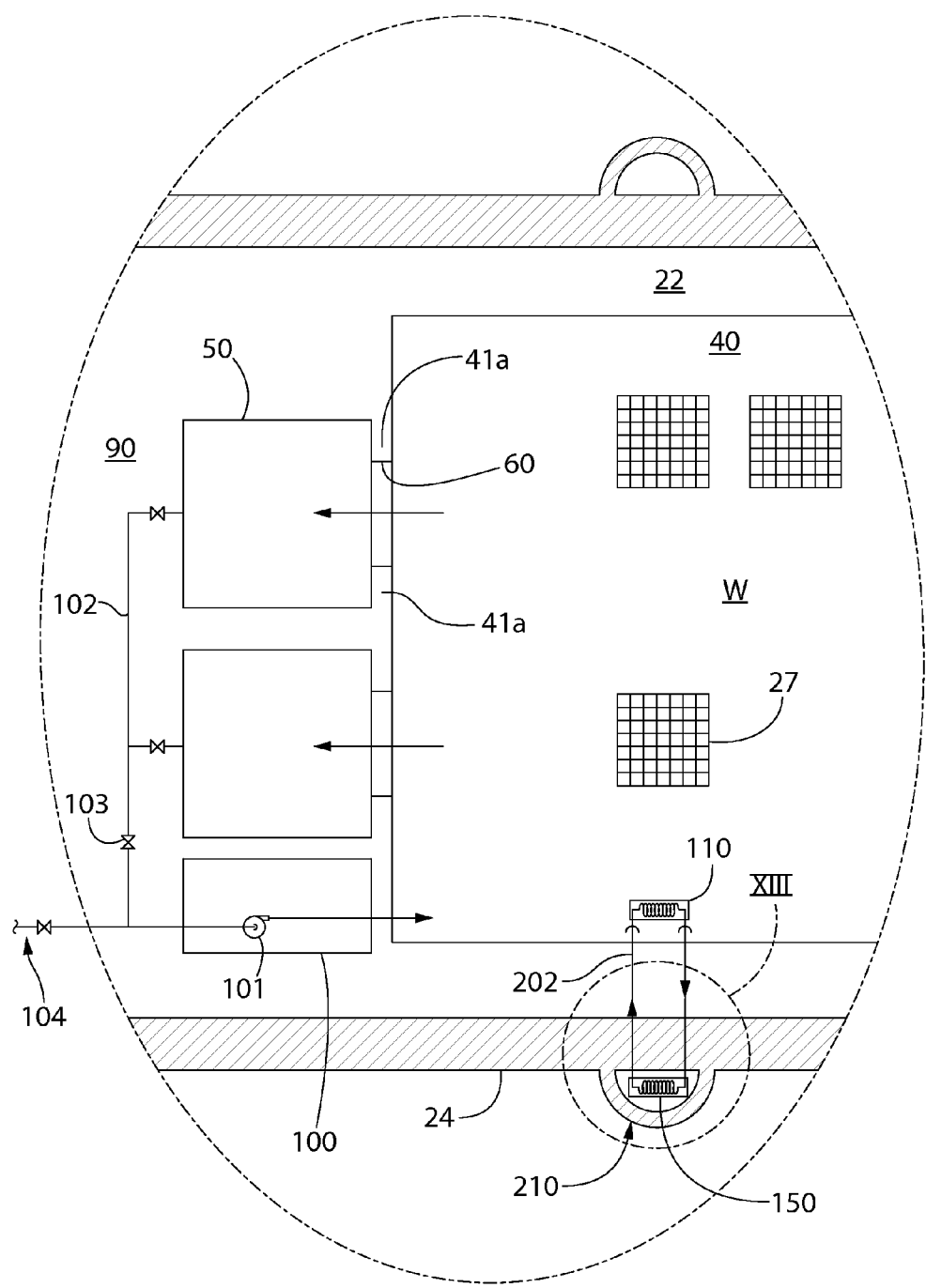
FIG. 12 is an enlarged top plan cross-sectional detail view taken from FIG. 6.
Figure 14:
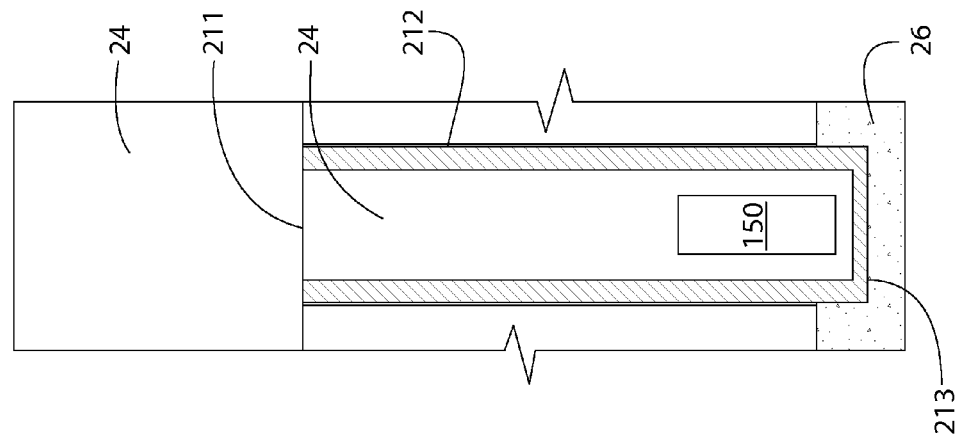
FIG. 14 is a transverse cross-sectional view taken along line XIV-XIV in FIG. 13.
Figure 13:
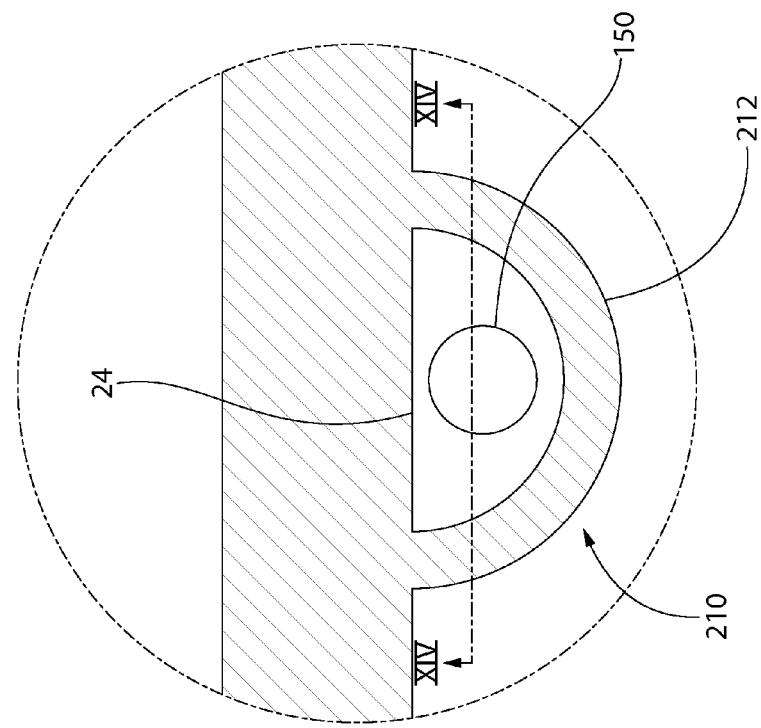
FIG. 13 is an enlarged top plan cross-sectional detail view taken from FIG. 12.
Figure 15:
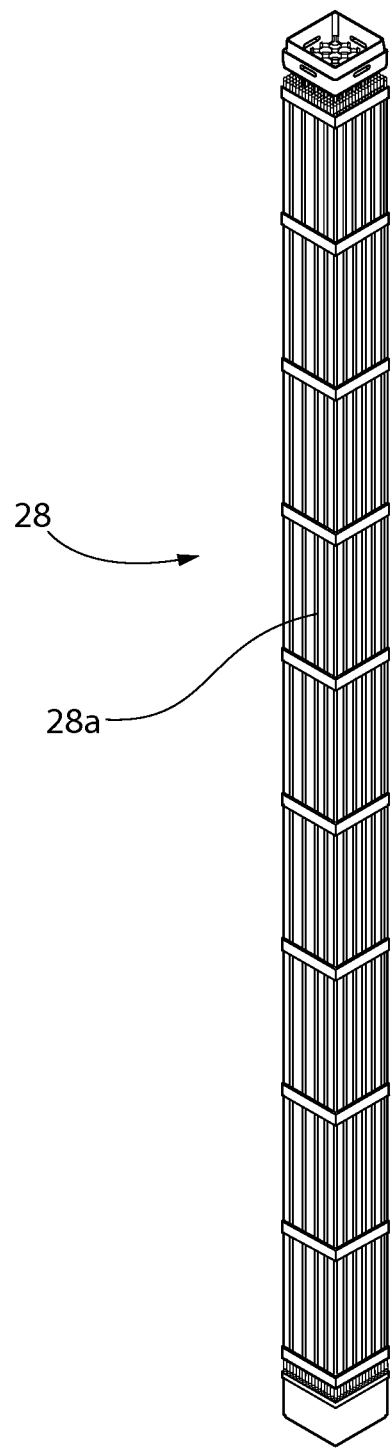
FIG. 15 is a perspective view of a nuclear fuel assembly.

A fuel assembly storage rack 27 is shown in FIG. 12 and described in commonly assigned U.S. patent application Ser. No. 14/367,705 filed Jun. 20, 1014, which is incorporated herein by reference. The rack contains a plurality of vertically elongated individual cells as shown each configured for holding a fuel assembly containing a plurality of individual fuel rods. An elongated fuel assembly 28 is shown in FIG. 15 holding multiple fuel rods 28a and further described in commonly assigned U.S. patent application Ser. No. 14/413,807 filed Jul. 9, 2013, which is incorporated herein by reference. Typical fuel assemblies 28 for a pressurized water reactor (PWR) may each hold over 150 fuel rods in 10×10 to 17×17 fuel rod grid arrays per assembly. The assemblies may typically be on the order of approximately 14 feet high weighing about 1400-1500 pounds each.

With continuing reference to FIGS. 1-12, the spent fuel pool 40 may be formed within the base mat 21 when the concrete is poured and comprises vertical sidewalls 41 rising from an adjoining substantially horizontal bottom slab or wall 42 (recognizing that some slope may intentionally be provided in the upper surface of the bottom wall for drainage toward a low point if the pool is to be emptied and rinsed/decontaminated at some time and due to installation tolerances). In one embodiment, four sidewalls 41 are provided and the pool has an elongated rectangular shape (in top plan view) with two longer sidewalls and two shorter sidewalls. Other configurations of the fuel pool 40 are possible such as square shapes, other polygonal shapes, and non-polygonal shapes. The rectangular shape with shorter and longer sidewalls 41 is preferred to limit the lateral span (perpendicular to building longitudinal axis LA) for cranes which may be used to transfer fuel assemblies 28 between the transport casks and fuel racks 27. The surface level of pool water W (i.e. liquid coolant) in the pool 40 may be spaced below the operating deck 22 by a sufficient amount to prevent spillage onto the deck during fuel assembly loading or unloading operations (reference FIG. 10B).

At least one cask pit 50 is also recessed below the operating deck 22 in the base mat 21 and formed integrally with the fuel pool 40. The cask pit is located adjacent to the fuel pool and separated by stub wall portions 41a of the end sidewall 41 between the cask pit and pool (see, e.g. enlarged view of FIG. 12). Similarly to the fuel pool 40, the cask pit 50 includes vertical sidewalls 51 and a bottom slab or wall 52 that defines an upper surface wetted by the pool water. Both the cask pit and fuel pool may have a rectilinear shape in top plan view. A vertically short curb 153 may be provided to separate the bottom walls of the cask pit and fuel pool in some embodiment (see, e.g. FIG. 10B) In some implementations, two cask pits are provided to allow a fuel transport cask to be loaded/unloaded from one cask pit while fuel assemblies are unloaded from a submerged cask in the remaining cask pit and transferred to a fuel storage rack in the fuel pool 40. The cask pits 50 have a depth D2 which is substantially the same as the depth of the fuel pool 40. The elevation of the upper surfaces of the bottom slabs 42, 52 in the fuel pool and cask pits may be substantially the same. In one embodiment, each cask pit 50 defines a volume and size which is large enough to hold only a single cask at a time.

A fluid passageway 60 is formed in the base mat 21 between the cask pit 50 and fuel pool 40 which places the volume of the cask pit in fluid communication with volume and pool water W retained in the fuel pool (reference FIGS. 1-12). Pool water is exchangeable between the cask pit and fuel pool for fuel loading/unloading operations, as further described elsewhere herein. The pool water depth and surface level 43 in the cask pit 50 is therefore the same as the water depth in the fuel pool 40 when the passageway 60 is open. The passageway 60 has a vertically elongated rectilinear shape in one non-limiting embodiment (see, e.g. FIGS. 8, 9, and 11) extending from the operating deck 22 to a point proximate the bottom walls of the cask pit 50 and fuel pool 40. Passageway 60 has vertical sides, a horizontal closed bottom, and an open top which extends completely through and penetrates the operating deck 22. The height of the passageway may be substantially coextensive with the height (i.e. depth) of the cask pit 50 and fuel pool 40 in some embodiments.

In certain embodiments, the passageway 60 has a height greater than one-half of the depth D2 of the cask pit to allow a fuel assembly 28 (see, e.g. FIG. 15) comprising a plurality of fuel rods to pass through the passageway from the cask pit 50 into the fuel pool 40 while maintaining the assembly in an upright vertical position with a top of the assembly being space below the operating deck 22 of the building 20. Advantageously, this allows the fuel assembly 28 to be removed from a cask 300 in the cask pit 50 and linearly transferred/translated to a fuel rack 27 on the bottom of the pool while remaining completely submerged and underwater to provide radiation shielding.

Figure 9:
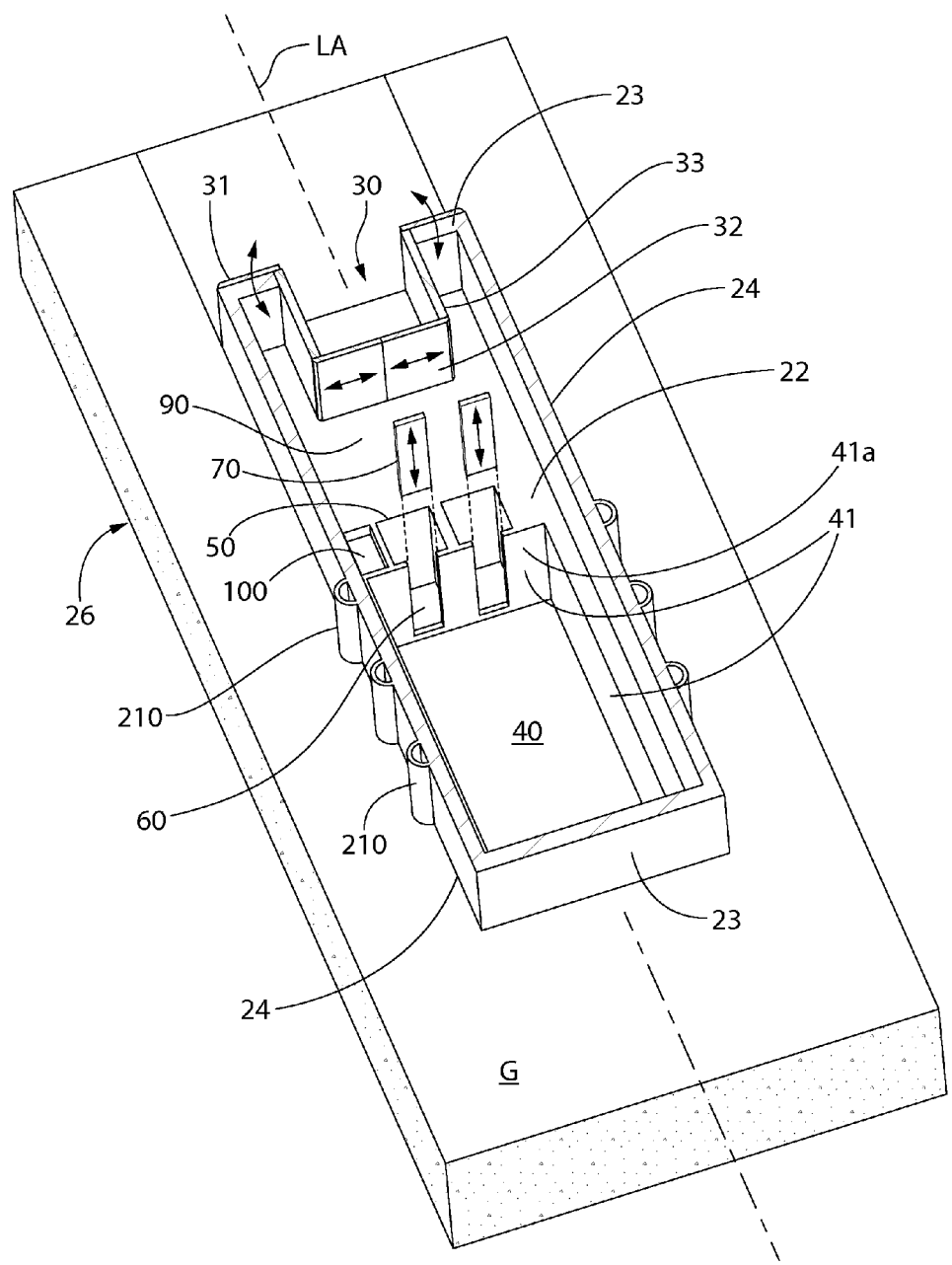
FIG. 9 is a top perspective view thereof from a second end vantage point with roof removed.
Figure 10A:
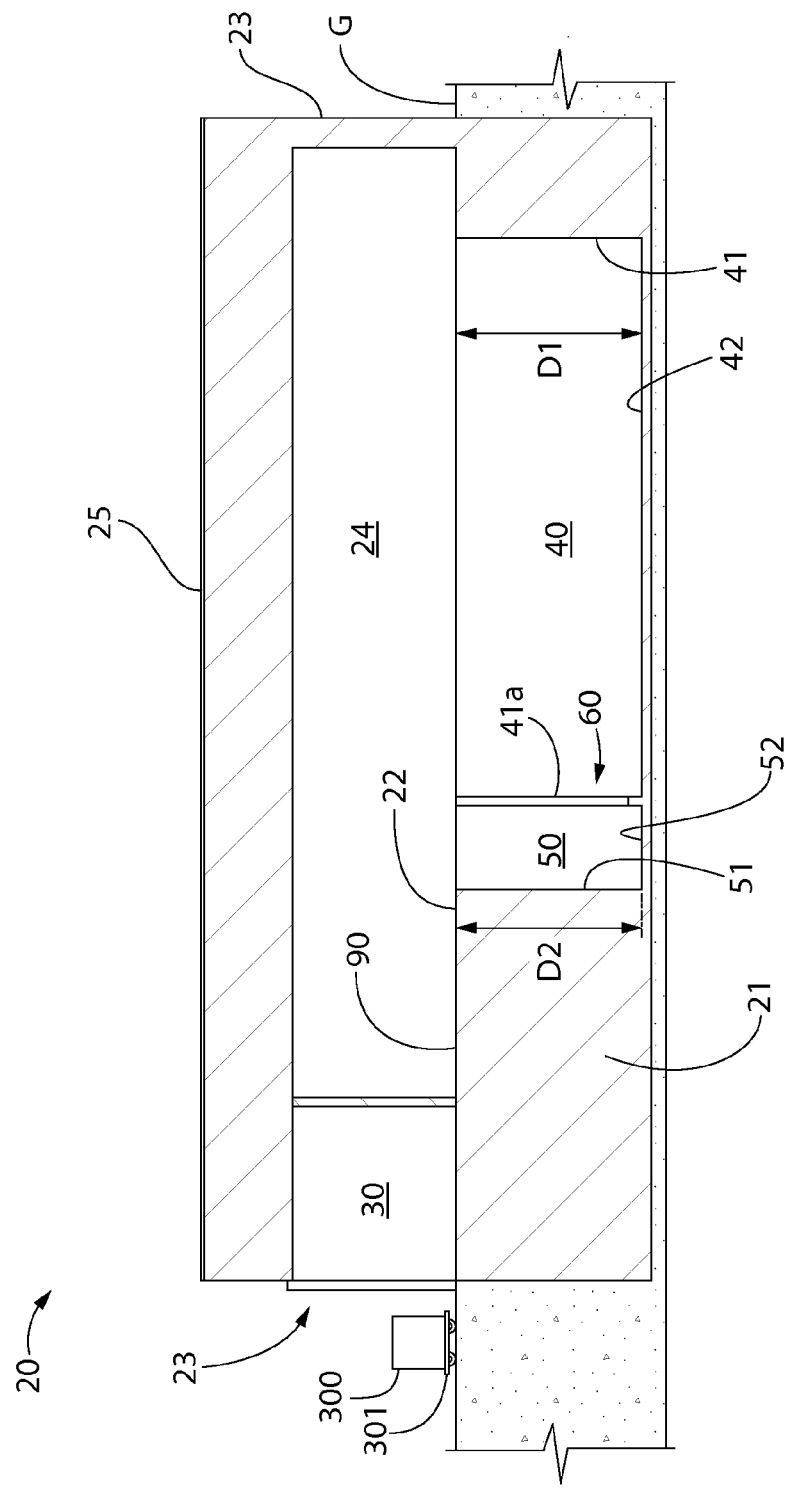
FIG. 10A is a longitudinal cross-sectional view thereof.
Figure 11:
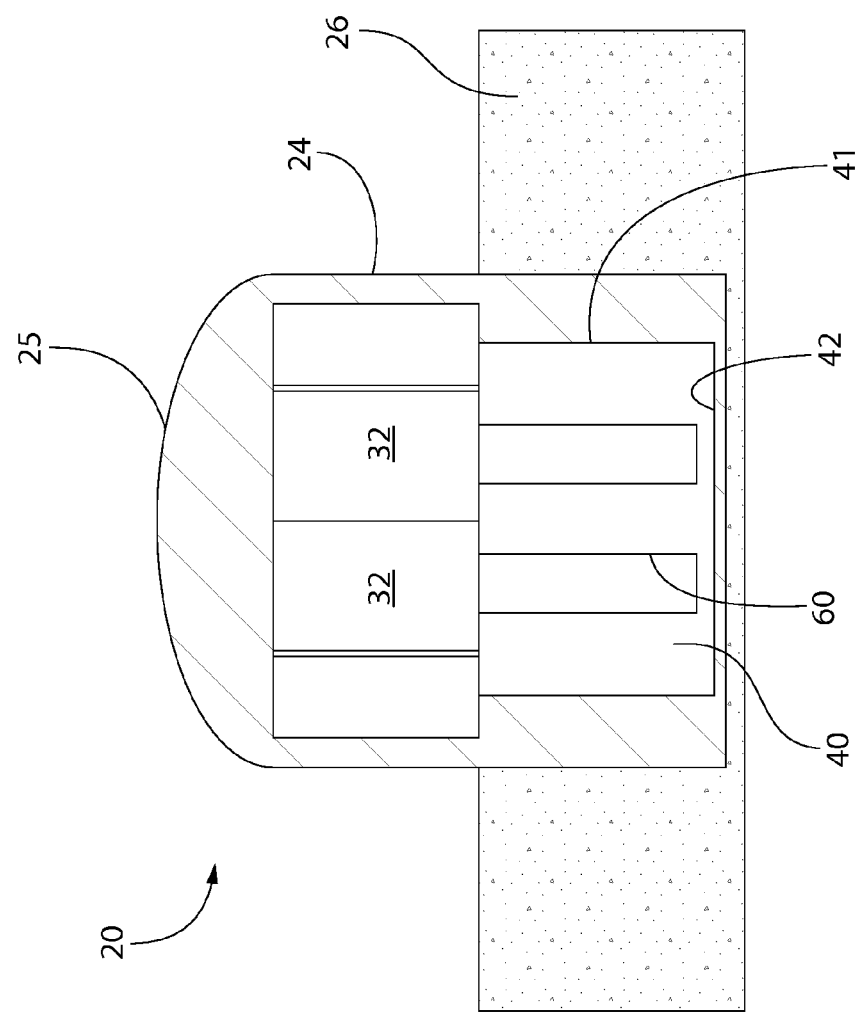
FIG. 11 is transverse cross-sectional view taken along line XI-XI in FIG. 6.

Referring still generally to FIGS. 1-12, an isolation gate 70 is movably disposed in each passageway 60 which is operable to fluidly isolate the cask pit 50 from the fuel pool 40 as shown in FIG. 9. The gate 70 is movable between an open position in which pool water W can flow between the fuel pool and cask pit, and a closed position in which liquid coolant cannot flow between the fuel pool and cask pit in which the gate fully blocks and fluidly closes the passageway 60. When the cask pit 50 is empty (i.e. no water within), partially opening the isolation gate 70 from a fully closed position will cause pool water to flow into and fill the cask pit to the same level as the fuel pool.

The isolation gate(s) 70 may operate to open and close, and fluidly seal the passageway 60 in any suitable manner. In one non-limiting example, the gates may slide vertically up and down in tracks formed in the pair of opposing stub walls 41a that define the passageway. The tracks may be formed by corrosion resistant metal U-shaped structural channels 71 attached to each of the stub walls as shown in the partial top plan view of FIG. 16A. Metal or non-metallic sealing gaskets may be incorporated into the channels 71 to prevent excessive leakage between the fuel pool 40 and cask pit 50 when the gate 70 is closed. When the cask pit 50 is emptied of pool water W, the pressure force of the water in the filled fuel pool 40 will tend to force the gate 70 against the rear surface of the channels to help promote a leak resistant seal. The gates 70 may be made of any suitable material (preferably corrosion resistant) such as metal (e.g. stainless steel, epoxy coated steel, etc.), concrete, composites, or combinations thereof.

Preferably, the isolation gates 70 are fully removable from the opening of the passageway 60 and do not provide an overhead obstruction which might interfere with the underwater transfer of fuel assemblies 28 between the cask pit 50 and fuel pool 40. In one embodiment, the gates 70 may be raise and lowered, and completely removed from the passageway 60 by an overhead crane.

Figures 16A, 16B:
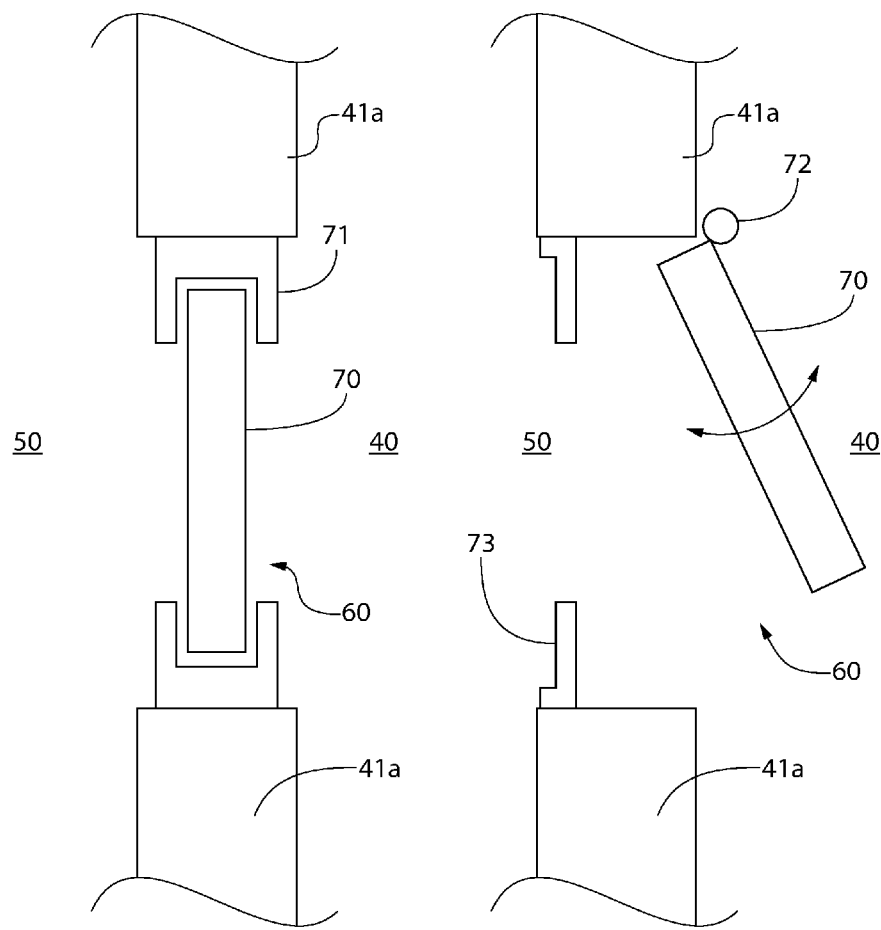
FIGS. 16A and 16B show two embodiments of an isolation gate operable to close a passageway between a fuel pool and cask pit of the present building.

Still other arrangements as shown in FIG. 16B may be used to movably mount the isolation gate 70 in the passageway 60, such as pivotable mounts using a pinned hinge 72 with jamb 73 and/or other means to provide a sealing surface. Accordingly, the invention is not limited by the manner of mounting or moving the gates.

Referring to FIG. 1-12, the fuel storage facility or building 20 further includes an air lock 30 which is intended to prevent release of the atmosphere inside the building to the outside ambient environment. The air lock is formed between hinged pairs of outer access doors 31 to the building and inner doors 32 leading form the air lock into the building interior. A pair of opposing building interior partition walls 33 provides a fully enclosed air lock when the doors 31, 32 are closed. Walls 33 extend from the front end wall 23 parallel to the building longitudinal axis LA into the interior of the building.

In one embodiment, the interior of the building 20 may be maintained at a slightly negative pressure by an appropriately configured and designed air handling system such as a heating ventilating and air conditioning (HVAC) system. The purpose of the HVAC system is to provide a means to remove excess moisture from the fuel storage building and to provide for capture of particulates and harmful gases that may be produced in the building. The fuel building is maintained at a slightly sub-atmospheric pressure to ensure that its air does not migrate outside the building. The HVAC system 34 therefore includes appropriately configured and selected fans and air filtration system 35 so that any air exchange through the air lock 30 with the outside ambient environment results in ambient air leaking or flowing into the building and not vice-versa (see, e.g. FIG. 6).

Figure 6:
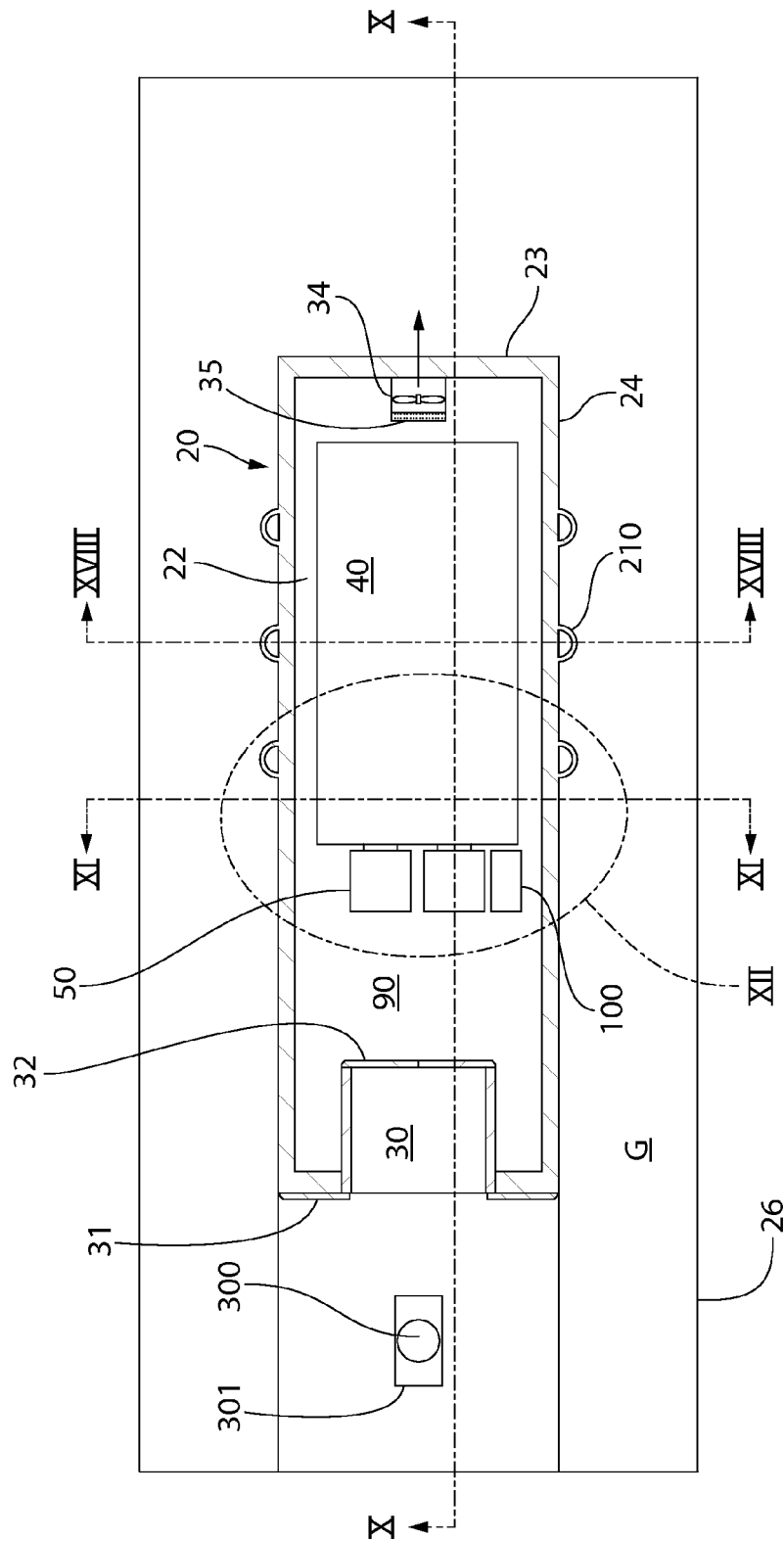
FIG. 6 is a top plan cross-sectional view thereof showing an air lock with outer access doors in an open position and inner access doors in a closed position.
Figure 7:
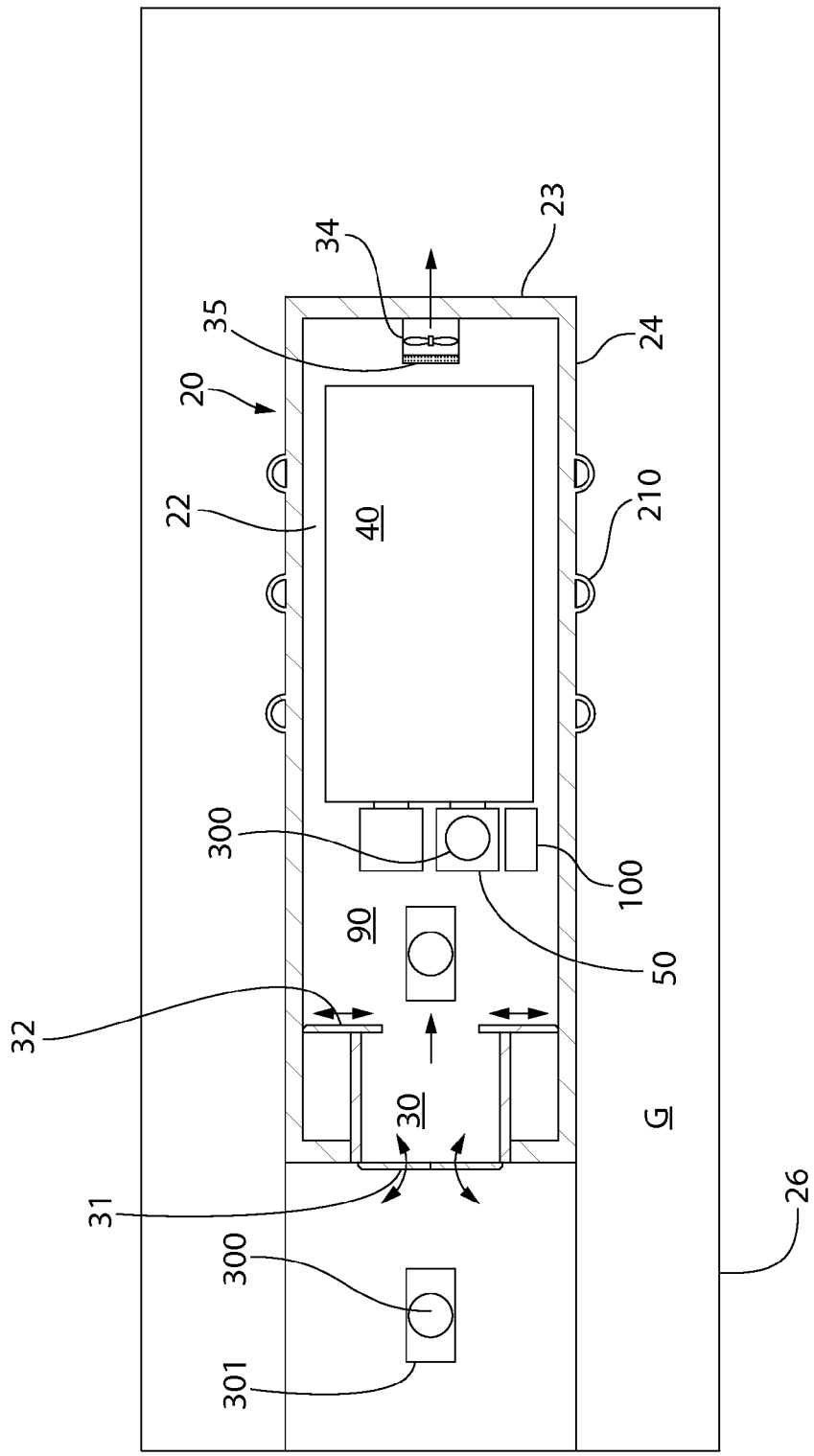
FIG. 7 is a top plan cross-sectional view thereof showing the air lock with outer access doors in a closed position and inner access doors in an open position.
Figure 8:
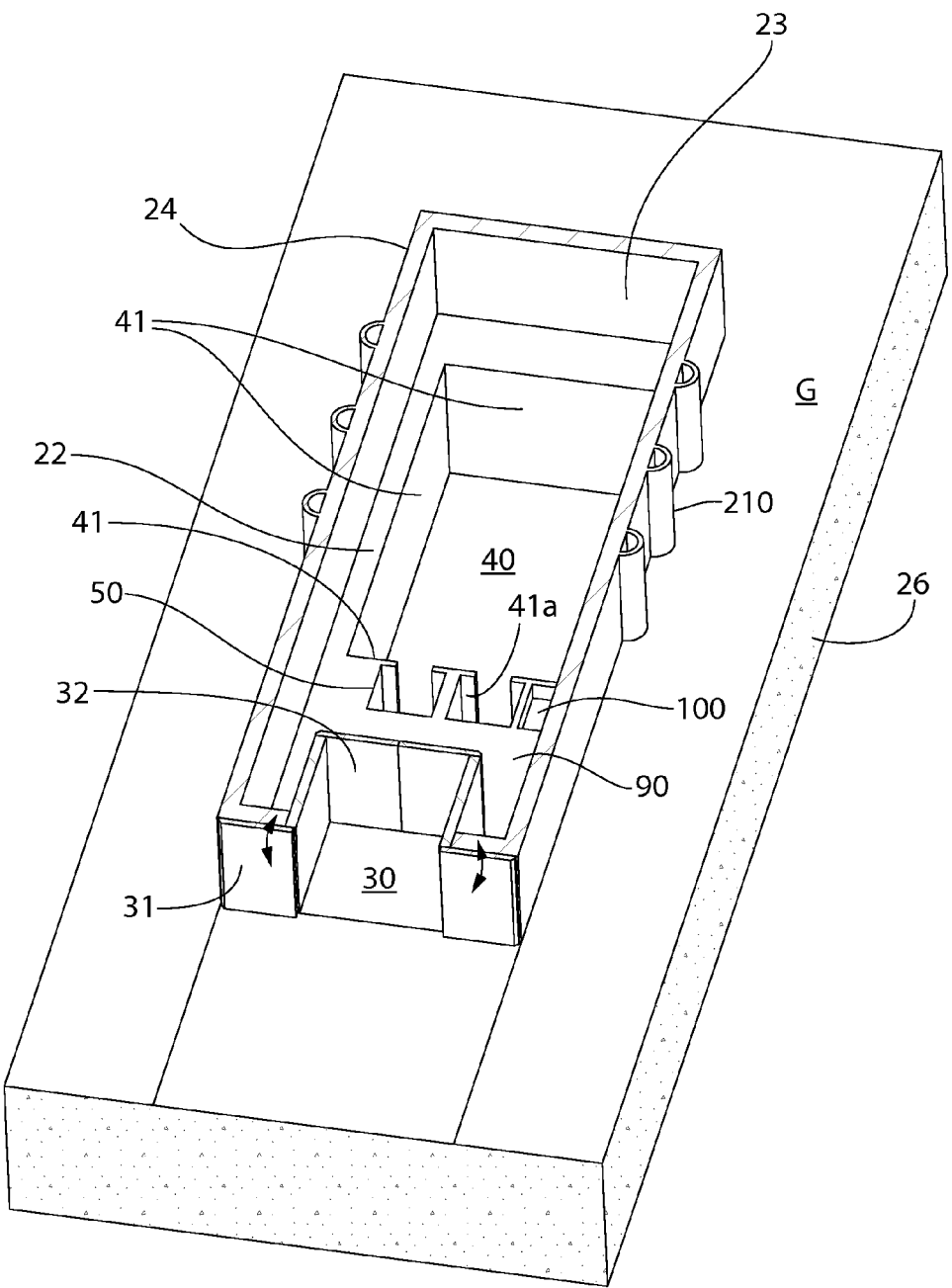
FIG. 8 is a top perspective view thereof from a first end vantage point with roof removed showing the interior of the building.

Doors 31 and 32 may be movably mounted to the building 20 and operated by any suitable manner for opening/closing such as without limitation, pivoting hinged operation, sliding operation, or other (see, e.g. FIGS. 6, 7, and 9).

The building 20 may contain one or more overhead cranes for maneuvering transport casks and fuel assemblies within the building interior. In one non-limiting implementation, two cranes may be provided including a (1) dedicated cask crane 80 which may be a single-failure proof (NOG-1) gantry or bridge type crane with suitable lifting capacity to move and hoist a fully loaded fuel transfer or transport cask, and (2) a fuel assembly crane 81 which may be a bridge or gantry crane to perform the fuel handling operation (such as spent fuel pool rack 27 movement and/or spent fuel assembly 28 movement). FIG. 10B schematically illustrates both cranes 80, 81. Both the cask crane 80 and fuel assembly crane 81 are preferably capable of movement both parallel to the longitudinal axis LA for longitudinal moving the load and transverse to the longitudinal axis for laterally moving the load. The cask crane provides the ability to translocate the cask between the cask pit and the access bay 90 further described herein. In some embodiments, the cask or fuel assembly crane 80, 81 may be used to remove or place the isolation gates 70 in the passageways 60.

Bridge cranes typically are supported by the vertical walls of the building structure which in turn transfer the load to the floor or foundation. They are typically used for lighter duty service. Longitudinally-extending horizontal rails are mounted on the walls. A horizontal structural lifting member on which is mounted the hoist/motor assembly spans between rails on opposing walls. Gantry cranes typically are suitable for heavy duty serve because they are directly supported from the floor or foundation and do not transfer the load to the walls. Gantry cranes generally have a horizontal structural lifting member on which is mounted the hoist/motor assembly and two vertical support columns with wheels on the lower end which run along a laterally spaced apart pair of tracks or rails in the floor. Such cranes are therefore capable of lifting and moving extremely heavy loads, such as the casks which may weight 100-150 tons when loaded. By contrast, the individual fuel assemblies weigh about 1400-1500 pounds each (noted above) making the lighter-duty bridge cranes suitable for such loads. It bears noting however that a bridge-type crane may be used for the cask crane 80 is the walls are sufficiently thick and strong. In other possible embodiments, a single gantry or bridge type crane capable of lifting both the casks and fuel assemblies may be used. Such an arrangement while still suitable, however, may slow the fuel storage and cask maneuvering/unloading operations of the fuel storage facility.

Referring now to FIGS. 1-12, a portion of the operating deck 22 and building 20 between the fuel pool 40 and air lock 30 defines an access bay 90 for staging the casks and crawlers. The access bay is sufficiently long and wide to permit a crawler to move onto the bay and lift the cask offer the crawler and into the cask pit 50 using crane 80. Accordingly, the footprint (i.e. longitudinal length and transverse width) of the access bay 90 is at least larger than the crawler and cask. Access bay 90 in some embodiments for example without limitation may be at least 35 feet long extending from the edge of the cask pit 50 to the building's air lock 30. The access bay provides sufficient space for the maneuverability of the crawlers to transfer the transport cask from and to the cask lay down area in the cask pit. The access bay 90 floor level may be the same as the operating deck 22 level. The air lock 90 provides the means to bring equipment such as a cask, into the fuel building without a direct path for interaction of the in-building air and that outside Adjacent to the cask pit 50 and recessed into the base mat 21 is a water management pit 100 that houses a demineralizer skid to clean up the pool (see, e.g. FIGS. 6-12). The demineralizer vessels are elevated and are provided with a bottom trap door arrangement such that storage canister (low-level radioactive waste storage canister) can be brought underneath the vessel. When the resin bed is fully spent it is ejected via the trap door to the underlying storage canister which is then removed. The demineralizer skid is also designed to provide makeup demineralized water by taking in raw water (or treated water) from local sources. The water management pit 100 may have a depth greater or less than the depth of the cask pits 50.

The water management pit 100 includes at least one hydraulic pump 101 and a tank (not shown) for controlling the water level in the fuel pool 40. Pool water may be transferred back and forth between the tank and fuel pool 40 to adjust the water level in the pool. The tank has a capacity sized to provide the necessary level adjustment in the fuel pool.

According to an aspect of the invention, the pump 101 is further operable to dewater the cask pits 50 via suitably configured and valved piping 102. The same pump 101 or different dedicated pump may be used for dewatering the cask pits. Piping 102 includes one or more shutoff valves 103 which allows either of the two cask pits 50 to be dewatered or for maintenance of the pump when the cask pits are flooded. The suction of pump 101 draws from one or both of the cask pits, and the pump discharges the water back into the fuel pool 40 under pressure via the discharge piping as shown. Either cask pit 50 may be dewatered by closing the passageway 60 with an isolation gate 70 and then operating the pump 101.

An incoming makeup water source pipe 104 with shutoff valve is provided to replenish pool water lost through evaporation. The makeup water source pipe is protected with redundant check valves to prevent back flow from the fuel pool. In one embodiment, the pump 101 may take suction from the source pipe to replenish the pool water as shown. In other embodiments, the makeup water source pipe 104 may bypass the pump and flow directly into the fuel pool 40.

According to another aspect, the autonomous spent fuel storage facility includes a passive pool cooling system which operates to cool the pool water in the fuel pool 40 even in the event of power loss. An example of a passive cooling system usable in the present facility is disclosed in U.S. patent application Ser. No. 13/450,150 filed Apr. 18, 2012, which is incorporate herein by reference. The passive cooling system is shown schematically in FIGS. 17 and 18.

The passive cooling system generally comprises two major components: (1) an inside bare tube bayonet type immersion heat exchanger 110 disposed in the pool water within the spent fuel pool 40 (preferably deep such as near the bottom slab or wall 42), and (2) an air cooled heat exchanger 150 located outside the spent fuel building 20 and thereby exposed to outside ambient atmosphere. The air cooled heat exchanger may be located along a sidewall 24 of the building.

The operating or working fluid 75 (i.e. heat exchange medium or coolant) used in the passive cooling system is a refrigerant with properties chosen such that it boils at the required bulk pool water temperature (at a moderate pressure, such as without limitation approximately 200 psi). The operating fluid is non-flammable and non-toxic in small quantities. The use of passive cooling ensures that the spent fuel pool water never leaves the fuel pool building 20 providing additional protection against any inadvertent releases. The pressurized passive system with a large elevation difference between the evaporator and the condenser ensures that any break does not allow for the spent fuel pool water to exit the building and also radionuclide transport to the environment outside the building through the passive cooling system is impossible.

Figure 18:
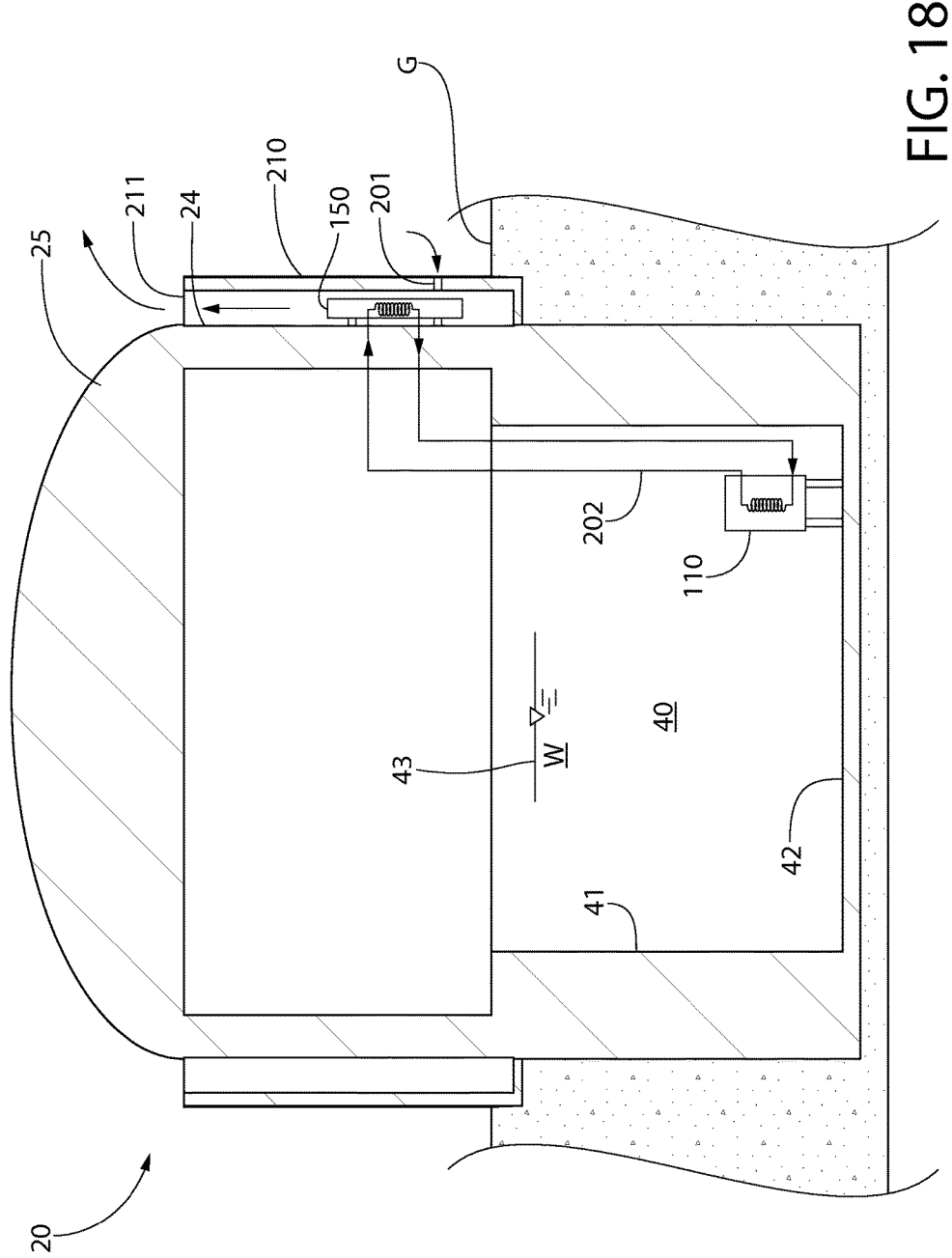
FIG. 18 is a transverse cross-sectional view taken along line XVIII-XVIII in FIG. 6.
Figure 19:
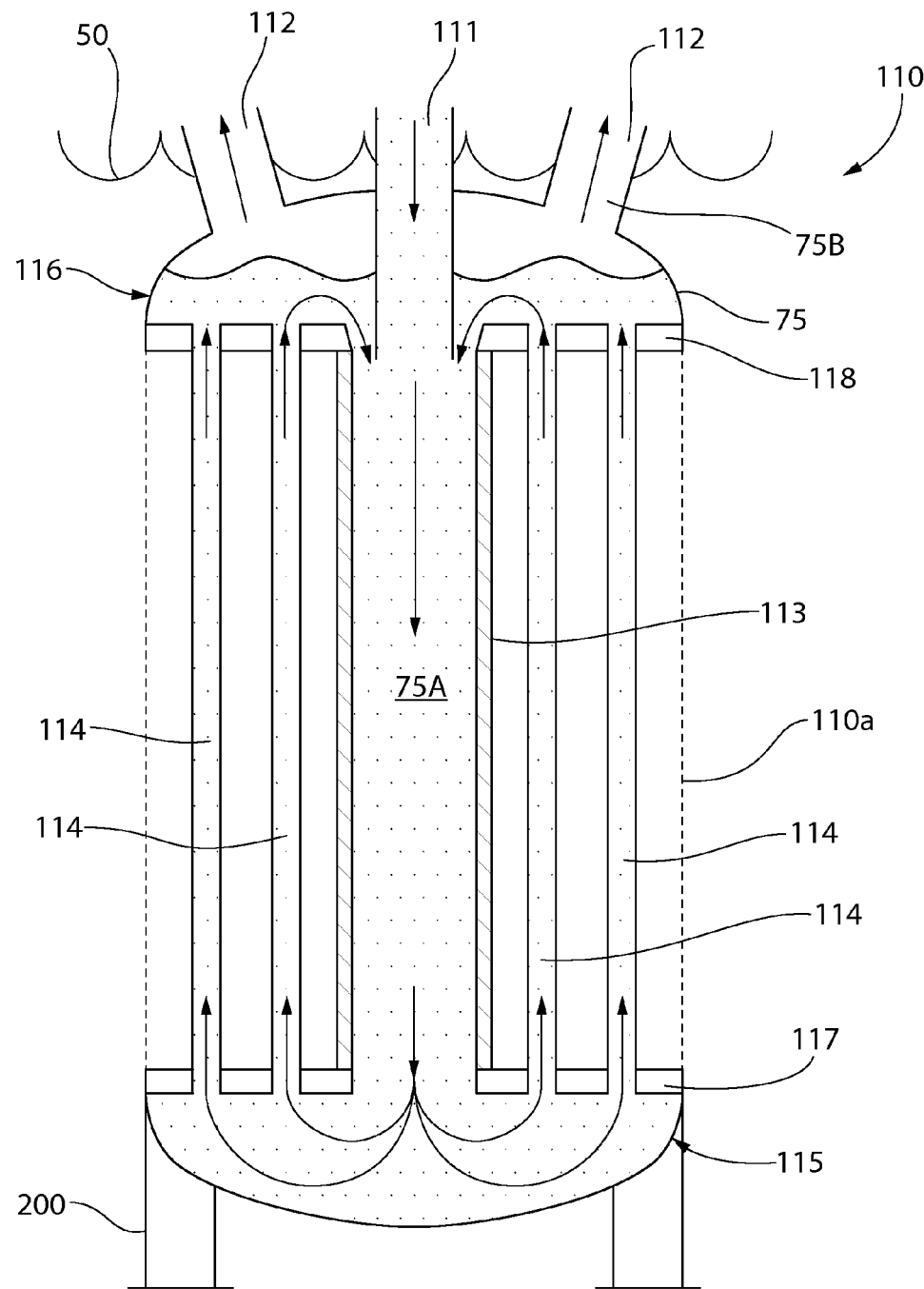
FIG. 19 is a side cross-sectional view of the immersion heat exchanger (evaporator) of the passive cooling system of FIG. 17.

The immersion heat exchanger 110 further shown in FIG. 19 acts as an evaporator and the air cooled heat exchanger 150 acts as a condenser. There is a significant elevation difference between the location of the immersion heat exchanger 110 in the fuel pool 40 and the air cooled heat exchanger 150 located above grade G outside the building walls (see, e.g. FIG. 18). This elevation difference allows the closed flow loop that naturally circulates the coolant operating or working fluid between the submerged immersion heat exchanger 110 inside and the air cooled heat exchanger 150 outside via gravity due to the thermal gradient difference in the closed loop system without assistance of power or pumps. The passive cooling system thus configured serves as "heat pipe" that does not rely on any electric power to continuously reject the fuel pool's heat to the ambient air.

In one embodiment, there may be multiple (e.g. four or more) sets of bayonet immersion heat exchangers 110 and air cooled (dump) heat exchangers 150 in the spent fuel pool facility each operating independently of others to impute maximum redundancy to the cooling system. Thus the passive cooling system will be online even if one set of heat exchangers (evaporator and condenser) is out of service. In one implementation, more than four evaporator-condenser sets each having a 25% capacity rating of the total heat load generated by the decaying spent nuclear fuel in fuel pool to be removed by the cooling system may be provided to maintain full 100% cooling capacity even if one set is offline.

The coolant working fluid 75 is preferably selected such that it boils at a set pool water temperature (e.g. about 150 F) and at a reasonable pressure. This fluid should be non-flammable and non-toxic in small quantities to personnel. Volatility is also preferred for the coolant since, if a small quantities leaked, it would be immediately vaporized and removed by the building HVAC system. The working fluid selected will vaporize in the bayonet heat immersion exchanger 110 located in the spent fuel pool (e.g. at 150 F) and the vapor routed to the air cooled heat exchanger 150 located outside the building where the ambient air (e.g. at 100 F maximum preferably) will remove the latent heat and condense the vapor inside the tubes. The condensate is collected and routed back to immersion heat exchanger. A closed piping circuit or loop 202 is provided between the heat exchangers 110 and 150 which penetrates the sidewalls 24 of the building 20. This heat transfer process and natural coolant flow circulation is completely passive by virtue of the phase transfer phenomenon and the elevation difference between the evaporator and the condenser. A suitable industrial coolant or refrigerant working fluid for this purpose is sold under the trade name RF 134A available from Praxair of Danbury, Conn. Other suitable refrigerants may be used.

Figure 17:
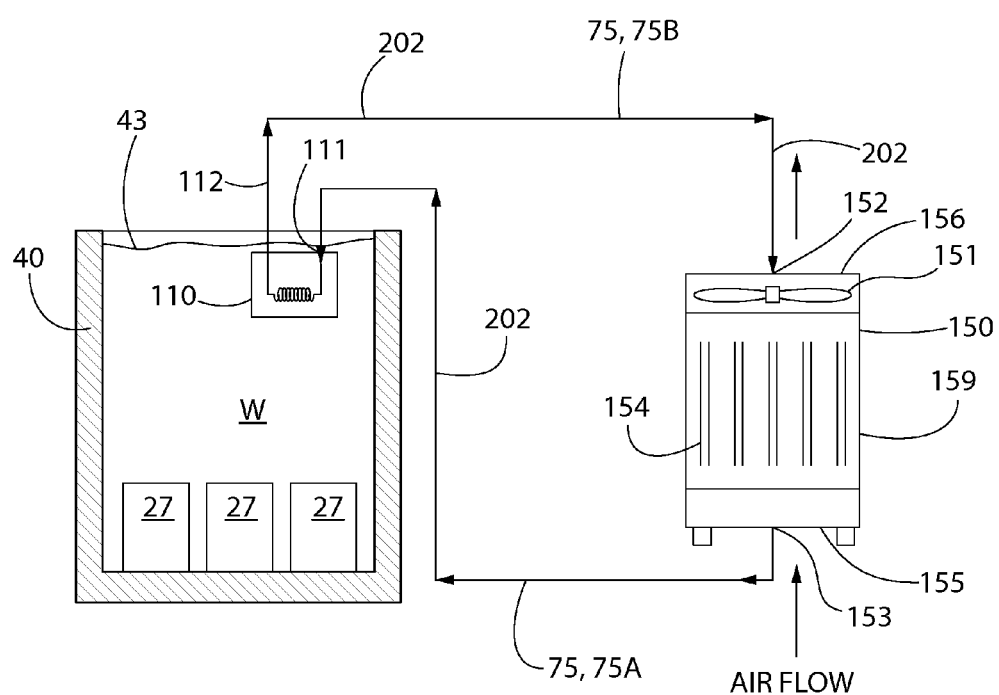
FIG. 17 is a schematic diagram of a passive fuel pool cooling system incorporated with the facility.

Referring to FIGS. 12 and 17-19, the immersion heat exchanger 110 is located and mounted in the spent full pool and has supports 200 (e.g. legs or skirt at the bottom head) that allow for the heat exchanger to be mounted on and stand on the spent fuel pool slab or bottom wall 42 (see, e.g. FIG. 18). Heat exchanger 110 may be a bare straight tube vertical unit to maximize contact with the pool water and aid in natural circulation. In one embodiment a thin metallic full or partial shell 110a (shown in dashed lines) may be wrapped around the tube bundle which does not substantially diminish the heat exchange efficiency. In one, the shell 110a may be of perforated and/or slotted constructions to allow the ingress of heated pool water W to be drawn into contact with the heat exchange tubes. Heat exchanger 110 may be 30 feet or taller in some representative non-limiting examples; however, any suitable height, diameter, and/or number of tubes may be provided. The heat exchanger is preferably a completely welded construction and the tubes may be a double-walled tube-inside-tube construction to further preclude the possibility of leakage.

Referring to FIG. 18, the evaporative immersion heat exchanger 110 generally comprises a core tube 113 (which acts as a downcomer tube in the exemplified embodiment), a plurality of heat exchange tubes 114, a working fluid bottom header 115, and a working fluid top header 116, which collectively define a tubeside fluid circuit. The working fluid bottom header 115 comprises a bottom tube sheet 117 while the working fluid top header 116 comprises a top tube sheet 118.

In one embodiment, the bottom and top headers 115, 116 and the core pipe 113 are constructed of a corrosion resistant alloy, such as stainless steel. The bottom and top tube sheets are constructed of an aluminum clad stainless steel. The heat exchange tubes 114 are constructed of aluminum (as used herein the term "aluminum" includes aluminum alloys) and are welded to the aluminum cladding of the bottom and top tube sheets 117, 118 to make leak tight joints. The core pipe 113 will be welded to the stainless steel base metal of the bottom and top tube sheets 117, 118. Of course, other materials and construction methodologies can be used as would be known to those of skill in the art.

The core tube 113 extends from the working fluid outlet header 116 to the working fluid inlet header 115, thereby forming a fluid-tight path between the two through which the liquid phase 75A of the working fluid 75 (coolant) will flow. More specifically, the core tube 113 is connected to the lower and upper tube sheets 117, 118 of the working fluid headers 115, 116. The working fluid inlet 111 extends into the core tube 113 and introduces cool liquid phase 75A of the working fluid 75 into a top portion of the core tube 113. The core tube 113 is formed of a material that has a low coefficient of thermal conductivity (as compared to the material of which the heat exchange tubes 114 are constructed), such as steel. The core tube 113 may also comprise a thermal insulating layer, which can be an insulating shroud tube, to minimize heating of the liquid phase 75A of the working fluid 75 in the core tube 113 by the liquid W of the pool. Irrespective of the materials and/or construction of the core tube 113, the core tube 113 has an effective coefficient of thermal conductivity (measured from an inner surface that is contact with the working fluid 75 to an outer surface that is in contact with the liquid W of the pool) that is less than the effective coefficient of thermal conductivity of the heat exchange tubes 114 (measured from an inner surface that is contact with the working fluid 75 to an outer surface that is in contact with the liquid W of the pool) in certain embodiments of the invention. As discussed in detail below, this helps achieve an internal thermosiphon recirculation flow of the liquid phase 75A of the working fluid 75 within the evaporative heat exchanger 110 itself (indicated by the flow arrows in FIG. 18).

The plurality of heat exchange tubes 114 form a tube bundle that circumferentially surrounds the core tube 113. The plurality of heat exchange tubes 114 are arranged in a substantially vertical orientation. The heat exchange tubes 114 are constructed of a material having a high coefficient of thermal conductivity to effectively transfer thermal energy from the liquid W of the pool to the working fluid 75. Suitable materials include, without limitation, aluminum, copper, or materials of similar thermal conductivity. In one embodiment, the heat exchange tubes 114 are fumed tubes comprising a tube portion 119 and a plurality of fins 120 extending from an outer surface of the tube portion 119 (shown in FIG. 6). In the exemplified embodiment, each heat exchange tube 114 comprises four fins 120 extending from the tube portion 119 at points of 90 degree circumferential separation.

During operation of the autonomous self-powered system, cool liquid phase 75A of the working fluid 75 enters the evaporative heat exchanger 110 via the working fluid inlet 111 as discussed above. The liquid phase 75A of the working fluid 75 is considered "cool" at this time because it had been previously cooled in the outside condenser unit (i.e. air cooled heat exchanger 150). As the cool liquid phase 75A of the working fluid 75 enters the evaporative heat exchanger 110, it is introduced into the core tube 113. The cool liquid phase 75A of the working fluid 75 flows downward through the core tube and into the bottom header 115, thereby filling the bottom header 115 and flowing upward into the plurality of heat exchange tubes 114. As the liquid phase 75A of the working fluid 75 flows upward in the plurality of heat exchange tubes 114, thermal energy from the liquid W of the pool that surrounds the plurality of heat exchange tubes 114 is conducted through the plurality of heat exchange tubes 114 and into the liquid phase 75A of the working fluid 75, thereby heating the liquid phase 75A of the working fluid 75. The warmed liquid phase 75A of the working fluid 75 then enters the top header 116 where it is drawn back into the core tube 113 by a thermosiphon effect. As a result, the liquid phase 75A of the working fluid 75 is recirculated back through the aforementioned cycle until the liquid phase 75A of the working fluid 75 achieves the boiling temperature of the working fluid 75, thereby being converted into the vapor phase 75B of the working fluid 75. The vapor phase 75B of the working fluid 75 rises within the evaporative heat exchanger 110 and gather within a top portion of the top header 116 where it then exits the evaporative heat exchanger 110 via one or the working fluid outlet(s) 112 which may be combined into a single line flowing through piping loop 202. The internal design of the evaporative heat exchanger 110 promotes recirculation of the working fluid 117 and separation of the vapor phase 75B from the liquid phase 75A in the top header 116 (as shown in FIG. 18).

Referring now to FIGS. 12-14 and 18, the air cooled heat exchanger 150 is located outside the spent fuel pool building inside a semicircular steel reinforced concrete structure such as silo 210 whose flat vertical sidewall opposite the arcuately curved sidewall 212 is a portion of the side wall 24 of the spent fuel pool building 20. The silo thus defines an enclosed and protected interior space or cavity sized to house the heat exchanger 150. The concrete silo 210 serves three purposes (1) to provide missile protection to the heat exchanger (i.e. condenser), (2) acts as a skirt to improve the chimney effect for natural circulation and (3) provide seismic support for the heat exchanger.

The air cooled heat exchanger 150 may be supported off the flat side wall 24 of the building and/or may have a skirt or legs that rest on grade (which in certain embodiments may be well above the pool's operating deck 22 elevation). In either arrangement, the heat exchanger 150 is preferably raised several feet (e.g. 2 to 3 feet) above grade G, which is several feet above the maximum possible flood level. Accordingly, the heat exchanger 150 is protected from submergence during the plant's Design Basis Flood. The bottom 213 of the silo 210 may be open to the soil to allow drainage of rain water accumulated inside the silo. In other embodiments, the bottom 213 of the silo may be solid or solid and include drainage penetrations. Preferably, the arcuately curved sidewall 212 extends for a depth below grade for added protection such that the bottom 213 of the silo is also below grade (see, e.g. FIG. 14).

The silo 210 is open or slotted for the bottom few feet above grade G to provide ingress for cooling air intake. Ambient cooling air flows laterally through the air vents 201 in the silo 210 and upwards inside the silo towards open top end 211. The heated cooling air is discharged through the open top 211 of the silo back to the atmosphere (see FIG. 18 and directional air flow arrows.

Referring now to FIG. 17, the passive induced air cooled heat exchanger 150 (i.e. air cooled-condenser) comprises a plurality of heat exchange tubes 154 positioned within an internal cavity formed by a housing 159. The working fluid 75 is the tubeside fluid and flows through the plurality of heat exchange tubes 154. The plurality of heat exchange tubes 154 are arranged in a substantially vertical orientation and may be finned to enhance the heat exchange efficiency between the working fluid and cooling air (see FIG. 20B).

Figure 20A:
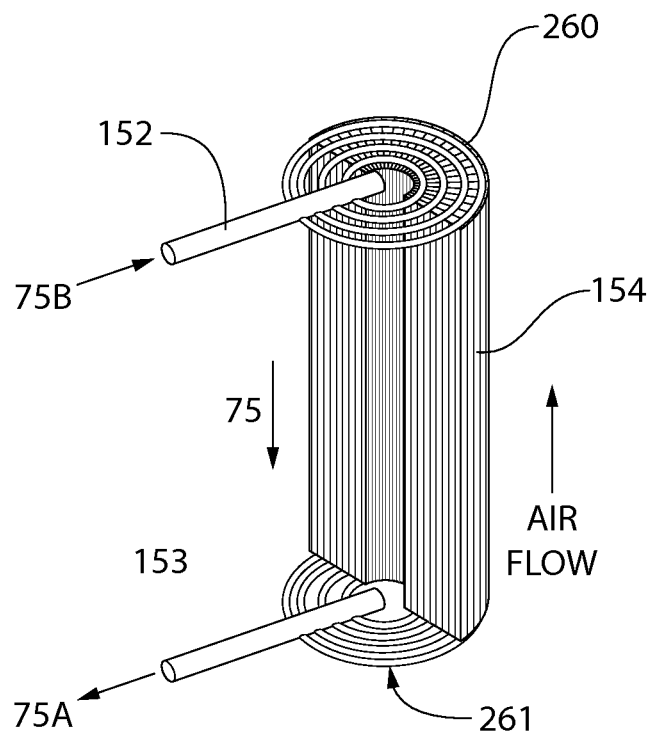
FIG. 20A is a perspective view of the inlet/outlet header and tube bundle assembly of the air cooled heat exchanger of FIG. 17.
Figure 20B:
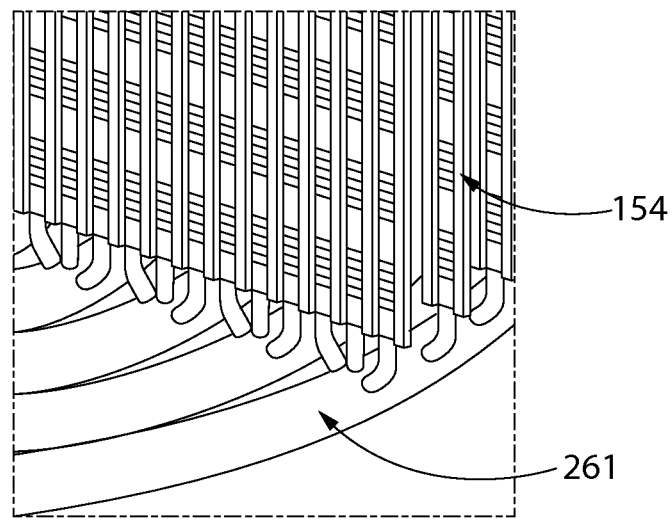
FIG. 20B is an enlarged detail of the fluid connections between the tubes and bottom header shown in FIG. 20A.

The passive induced flow air cooled heat exchanger 150 comprises a bottom cool air inlet 155 and a top warmed air outlet 156. The warmed air outlet 156 is at a higher elevation than the cool air inlet 155. The plurality of heat exchange tubes 154 are located in the cavity of the housing 159 at an elevation between the elevation of the cool air inlet 155 and an elevation of the warmed air outlet 156. As such, cooling air flow will be achieved by the natural convective flow of the air as it is heated passing over the tubes 154 (i.e., the chimney effect further enhanced by silo 210). As warmed air exits the heat exchanger 150 via the warmed air outlet 156 at top, additional cool air is drawn into the cool air inlet 155 at bottom. The working fluid inlet and outlet 152, 153 of the heat exchanger 150 is in fluid communication with the tubes 154 on the tubeside via an appropriately configured inlet and outlet headers 260, 261 as shown in FIGS. 20A-B. In the non-limiting illustrated embodiment, headers 260, 261 may each comprise a plurality concentrically arranged toroidal tubes. Other shaped headers however may be used so long as the working fluid 75 may be distributed to and collected from the tubes 154.

In some configurations, active air cooling capabilities may be added to the passive induction air cooled heat exchangers 150 by incorporating a motor driven fan or blower 151 into the natural draft operation if desired for situations where the outside ambient air may reach elevated temperatures that could negatively affect adequate heat removal from the working fluid 75. The blower 151 increases the heat removal capacity of heat exchanger 150. Such capability may also be desirable to reduce the pool bulk temperature to low values (say, for example without limitation under 135 degrees F.) to improve the effectiveness of the demineralizer beds during the (short) periods when the water clean-up system is being operated or during other building or fuel pool 40 operating scenarios.

It bears noting that the pressurized passive cooling system with a large elevation difference between the evaporator and the condenser ensures that any break does not allow for the spent fuel pool water to exit the building and also radionuclide transport to the environment outside the building through the passive cooling system is impossible The passive cooling system is a completely welded system which ensures a leak tight system. Small charging canisters of the operating fluid are attached to the system to provide make up in the case of minor leakages and the charging occurs through valves called low differential pressure check valves which actuate passively when the pressure in the system line falls below a threshold value.

A method for storing spent nuclear fuel will now be briefly described. In one embodiment, the transport casks 300 usable in the spent fuel storage facility may be Hi-Trac Transfer Casks available from Holtec International of Marlton, N.J. The casks are further described in U.S. Pat. No. 6,587,536 which is incorporated herein by reference. The casks include removable lids for loading/unloading fuel assemblies 28 therefrom. In some embodiments, a multi-purpose canister (MPC) available from Holtec may be used to store the individual fuel assemblies 28, which canister in turn is then loaded into the transport casks 300. The casks 300 are transported into and out of the autonomous fuel storage facility via the motorized crawlers 301. In one embodiment, the crawler 301 may be HI-LIFT crawler available form and co-produced by the Holtec International and J&R Engineering, Wisconsin.

The method may include the following steps with reference to FIGS. 6-7 and 10A-B. The outer access doors 31 to the building 20 are first opened and the inner doors 32 are closed. The crawler 301 with transport cask 300 loaded with spent nuclear fuel assemblies 28 enters the air lock 30. The outer doors 31 are closed. Thereafter, the inner doors 32 are then opened. The crawler and cask moves into access bay 90 and the inner doors may optionally then be closed. The lid on the cask may then be unbolted from cask for bolt type closures or seal welds cut with the lid remaining in place in both cases to maintain radiation shielding of the cask contents. The cask 300 with lid is lifted from the crawler 301 by the cask crane 80 and loaded into an empty and previously dewatered cask pit 50. To dewater a cask pit 50, the isolation gate 70 is inserted in passageway 60 and placed in the closed position, after which pump 101 is turned on (see also FIG. 12). The pit is emptied of pool water W, but not necessarily dry.

Next, pool water from the fuel pool 40 is introduced and flooded into the cask pit 50 containing the loaded cask 300. In one embodiment, this may be accomplished by opening gate 70 to allow water to flow into the cask pit. In other embodiments, separate piping and valving may be provided forming a flow path between the fuel pool and cask pit which may be used to flood the pit by opening the valve. Either approach may be used. The surface 43 of the water in the fuel pool and cask pit equalizes and reaches the same level, which in one embodiment may be about 24-30 feet or more above the top of cask to leave a margin of about 10 feet or more of water between the top of fuel assemblies stored in cask and water level in cask pit for shielding (see dashed line in FIG. 10B). At this point, if not already done, the gate 70 is completely opened or removed from the passageway 60 so that there are no overhead obstructions above the open passageway providing a pass-through to the fuel pool 40 from the cask pit 50.

The lid may then be removed from cask 300 using either the cask crane 80 or the fuel assembly crane 81 if the lid is not too heavy. The lighter duty fuel assembly crane then moves each fuel assembly 28 from cask under water through the open passageway 60 between the cask pit 50 and fuel pool 40 and loads them into the fuel racks 27 emplaced on the bottom wall (slab) of the pool.

After the fuel assembly unloading operation is done, the isolation gate 70 to the cask pit 50 is closed and pool water W is pumped back out of the cask pit into the fuel pool 40 to dewater the pit. The now empty cask 300 is lifted out of cask pit with the heavy duty cask crane 80 (while optionally spraying water onto the cask at the same time to remove any potential contaminants remaining on the exterior of the cask). The cask lid is placed back on the cask and closed (i.e. bolted or welded) and the cask is dried by any suitable means. The cask 300 is then loaded back onto the crawler 301 and secured. The empty cask and crawler may then leave the building 20 by operating the air lock 30 and doors 31, 32 in a reverse manner to that described above.

It should be noted that the foregoing ask unloading process may simply be reversed to remove fuel assemblies from pool 40, load an empty cask 300, and transport the cask outside the building and/or off-site.

The present arrangement with two cask pits 50 and cranes advantageously allows one cask to be staged and loaded/removed from a cask pit using heavy duty crane 80 while the light duty crane 81 removes fuel assemblies from a cask positioned in the remaining pit. This expedites the process of storing spent nuclear fuel in the fuel pool 40.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

What is claimed is:

1. A building for wet storage of spent nuclear fuel, the building comprising:
   a longitudinal axis;
   a concrete base mat defining a substantially horizontal operating deck;
   a plurality of substantially vertical perimeter walls supported by the base mat;
   a roof spanning across the perimeter walls;
   a spent fuel pool recessed in the base mat below the operating deck and having a first depth, the spent fuel pool containing coolant water having a surface level;
   a cask pit recessed in the base mat below the operating deck and formed integrally with the spent fuel pool, the cask pit located adjacent the spent fuel pool and having a second depth;
   a fluid passageway formed through the base mat between the cask pit and spent fuel pool, the cask pit in fluid communication through the passageway with the spent fuel pool wherein liquid coolant is exchangeable between the spent fuel pool and cask pit; and
   an isolation gate movably disposed in the passageway and operable to fluidly isolate the cask pit from the spent fuel pool, the gate movable between an open position in which liquid coolant can flow between the spent fuel pool and cask pit, and a closed position in which liquid coolant cannot flow between the spent fuel pool and cask pit;
   a passive cooling system for cooling the water in the spent fuel pool, the cooling system comprising an internal immersion heat exchanger submerged in the spent fuel pool and an external air cooled heat exchanger located outside the perimeter walls, the immersion heat exchanger located below grade and the air cooled heat exchanger located above grade creating an elevation difference;
   a closed flow loop formed between the immersion and air cooled heat exchangers, the flow loop containing a circulating heat exchange working fluid, wherein the working fluid circulates by natural gravity driven flow between the immersion and air cooled heat exchangers wherein the spent fuel pool is cooled in the absence of electric power to the facility;
   wherein the air cooled heat exchanger is disposed inside a cavity of a vertically elongated steel reinforced concrete silo, the silo attached to one of the plurality of substantially vertical perimeter walls of the facility and configured so that no part of the closed flow loop is exposed on an exterior of the building;
   wherein the silo includes an open top defining an air outlet and air intake vent in a sidewall of the silo defining an air inlet, the air inlet and outlet in fluid communication with the air cooled heat exchanger;
   wherein the silo includes a vertically extending semicircular sidewall which extends below grade, and opposing ends of the semicircular sidewall are attached to the one of the plurality of substantially vertical perimeter walls; and
   wherein when the gate is in the open position, water from the spent fuel pool flows into the cask pit wherein the surface level of water in the cask pit and pool equalize.

2. The building according to claim 1, wherein the passageway has an open top which penetrates the operating deck, a closed bottom, and opposing vertical stub walls formed by the base mat.

3. The building according to claim 1, wherein the first depth of the pool is substantially the same as the second depth of the cask pit.

4. The building according to claim 2, wherein the passageway has a height greater than one-half of the second depth of the cask pit to allow a fuel assembly comprising a plurality of fuel rods to pass through the passageway from the cask pit into the spent fuel pool.

5. The building according to claim 1, wherein the cask pit and the spent fuel pool each include a horizontal slab defining an upward facing bottom surface, the bottom surfaces being at substantially the same elevation.

6. The building according to claim 1, further comprising an air lock formed between a pair of outer access doors and a pair of inner access doors spaced longitudinally apart from the outer access doors.

7. The building according to claim 6, further comprising a first cask containing a plurality of nuclear spent fuel assemblies located on the operating deck in an access bay formed between the inner access doors and the cask pit.

8. The building according to claim 7, further comprising a first crane configured and operable to lift and move the first cask from the access bay into the cask pit.

9. The building according to claim 8, wherein the cask pit is sized to hold only the first cask and no others at a same time.

10. The building according to claim 9, further comprising a second cask pit sized to hold only a single cask similar in configuration to the first cask.

11. The building according to claim 7, wherein the passageway has a height sufficient to allow a single fuel assembly removed from the first cask by a second crane so that the single fuel assembly remains underwater while moving the single fuel assembly through the passageway into the spent fuel pool.

12. The building according to claim 1, further comprising an air handling system configured to maintain a negative atmospheric pressure inside the building.

13. The building according to claim 1, wherein the roof has a domed shape.

14. The building according to claim 1, wherein the perimeter walls and roof are formed of steel reinforced concrete.

15. The facility according to claim 1, wherein the one of the plurality of substantially vertical perimeter walls forms a second sidewall of the silo.

16. An autonomous impact resistant wet storage facility for spent nuclear fuel, the facility comprising:
a longitudinal axis;
a concrete base mat defining a substantially horizontal operating deck, the base mat disposed in soil having a grade and extending for a depth below grade;
a plurality of substantially vertical concrete perimeter walls supported by the base mat, the perimeter walls extending upwards from the operating deck and rising above grade;
a concrete roof spanning across the perimeter walls and collectively forming an enclosed building with the perimeter walls and base mat;
a spent fuel pool disposed in the building and recessed in the base mat below the operating deck for storing nuclear fuel assemblies, the spent fuel pool containing water for cooling the fuel assemblies;
a cask pit recessed in the base mat below the operating deck and formed integrally with the spent fuel pool, the cask pit located adjacent the spent fuel pool and having a second depth;
a vertically elongated fluid passageway formed through the base mat between the cask pit and spent fuel pool, the passageway extending vertically through the operating deck, wherein the cask pit is in fluid communication through the passageway with the spent fuel pool wherein pool water is flowable between the spent fuel pool and cask pit;
an isolation gate movably disposed in the passageway which operates to fluidly isolate the cask pit from the spent fuel pool, the gate movable between an open position in which the passageway is unobstructed so pool water can flow between the spent fuel pool and cask pit, and a closed position in which the passageway is obstructed so pool water cannot flow between the spent fuel pool and cask pit;
a passive cooling system for cooling the water in the spent fuel pool, the cooling system comprising an internal immersion heat exchanger submerged in the spent fuel pool and an external air cooled heat exchanger located outside the perimeter walls, the immersion heat exchanger located below grade and the air cooled heat exchanger located above grade creating an elevation difference;
a closed flow loop formed between the immersion and air cooled heat exchangers, the flow loop containing a circulating heat exchange working fluid;
wherein the working fluid circulates by natural gravity driven flow between the immersion and air cooled heat exchangers wherein the spent fuel pool is cooled in the absence of electric power to the facility;
wherein the air cooled heat exchanger is disposed inside a cavity of a vertically elongated steel reinforced concrete silo, the silo attached to one of the plurality of substantially vertical perimeter walls of the facility; and
wherein the silo includes a vertically extending semicircular sidewall which extends below grade, and opposing ends of the semicircular sidewall are attached to the one of the plurality of substantially vertical perimeter walls.

17. The facility according to claim 16, wherein the silo includes an open top defining an air outlet and air intake vent in a sidewall of the silo defining an air inlet, the air inlet and outlet in fluid communication with the air cooled heat exchanger.

18. The facility according to claim 16, wherein the one of the plurality of substantially vertical perimeter walls forms a second sidewall of the silo.

* * * * *